(12) United States Patent
Gao et al.

(10) Patent No.: US 12,519,529 B2
(45) Date of Patent: Jan. 6, 2026

(54) METHOD OF FAST BEAM REFINEMENT AND TRACKING FOR HIGH MOBILITY WIRELESS COMMUNICATION DEVICE

(71) Applicant: ZTE CORPORATION, Guangdong (CN)

(72) Inventors: Bo Gao, Shenzhen (CN); Zhaohua Lu, Shenzhen (CN); Yu Ngok Li, Shenzhen (CN); Ke Yao, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 824 days.

(21) Appl. No.: 17/877,161

(22) Filed: Jul. 29, 2022

(65) Prior Publication Data

US 2023/0006795 A1 Jan. 5, 2023

Related U.S. Application Data

(63) Continuation of application No. PCT/CN2020/120566, filed on Oct. 13, 2020.

(51) Int. Cl.
*H04B 7/06* (2006.01)
*H04L 5/00* (2006.01)

(52) U.S. Cl.
CPC ....... *H04B 7/06958* (2023.05); *H04L 5/0051* (2013.01); *H04L 5/0053* (2013.01)

(58) Field of Classification Search
USPC ........ 370/229, 230, 241, 252, 328, 329, 330
See application file for complete search history.

(56) References Cited

U.S. PATENT DOCUMENTS

| | | | |
|---|---|---|---|
| 11,637,666 B2* | 4/2023 | Grant | H04L 5/0044 370/329 |
| 11,758,412 B2* | 9/2023 | Matsumura | H04B 7/0658 370/329 |
| 11,991,541 B2* | 5/2024 | Zhang | H04L 5/0091 |
| 2019/0182007 A1* | 6/2019 | Liu | H04L 5/0048 |
| 2019/0296876 A1 | 9/2019 | Zhang et al. | |
| 2020/0106645 A1 | 4/2020 | Tsai et al. | |

(Continued)

FOREIGN PATENT DOCUMENTS

| | | |
|---|---|---|
| CN | 111066370 A | 4/2020 |
| WO | WO-2018/229078 A1 | 12/2018 |

(Continued)

OTHER PUBLICATIONS

First Examination Report for AU App. No. 2020472170 dated Jan. 12, 2024 (3 pages).

(Continued)

*Primary Examiner* — Nguyen H Ngo
(74) *Attorney, Agent, or Firm* — Foley & Lardner LLP

(57) ABSTRACT

Presented are systems and methods for fast beam refinement and/or tracking for high mobility wireless communication device. A wireless communication device may receive a plurality of reference signals (RSs) from a wireless communication node. The wireless communication device may send a report of at least a first RS of the plurality of RSs to the wireless communication node. The wireless communication device may determine information corresponding to a signal according to the first RS.

20 Claims, 11 Drawing Sheets

(56) References Cited

U.S. PATENT DOCUMENTS

2022/0046458 A1* 2/2022 Zhu ................... H04L 43/0823
2022/0201502 A1* 6/2022 Kang ..................... H04B 7/08

FOREIGN PATENT DOCUMENTS

WO  WO-2019/049096 A1  3/2019
WO  WO-2020/162731 A1  8/2020

OTHER PUBLICATIONS

Intel Corporation, "Enhancements on Multi-Beam Operation" 3GPP TSG RAN WG1 #102, R1-2006950, Aug. 28, 2020, e-Meeting (17 pages).

Lenovo et al., "Enhancements on beam management for multi-TRP" 3GPP TSG RAN WG1#102-e, R1-2005823, Aug. 28, 2020, e-Meeting (4 pages).

Mediatek Inc., "Enhancement on multi-beam operation" 3GPP TSG RAN WG1 #102-e, R1-2005619, Aug. 17, 2020, e-Meeting (7 pages).

Moderator (Samsung), "Moderator summary for multi-beam enhancement: advanced beam acquisition" 3GPP TSG RAN WG1 #102-e, R1-2007370, Aug. 28, 2020, e-Meeting (3 pages).

Moderator (Samsung), "Moderator summary for multi-beam enhancement: proposal categorization" 3GPP TSG RAN WG1 #102-e, R1-2006985, Aug. 28, 2020, e-Meeting (27 pages).

Moderator (Samsung), "Moderator summary#2 for multi-beam enhancement: proposal categorization" 3GPP TSG RAN WG1 #102-e, R1-2007189, Aug. 28, 2020, e-Meeting (27 pages).

Nokia et al., "Enhancements on Beam Management for Multi-TRP/Panel Transmission" 3GPP TSG RAN WG1 #102-e, R1-2006846, Aug. 28, 2020, e-Meeting (9 pages).

Nokia et al., "Enhancements on Multi-beam Operation" 3GPP TSG RAN WG1 #102-e, R1-2006843, Aug. 28, 2020, e-Meeting (20 pages).

Qualcomm Incorporated, "Enhancements on Multi-beam Operation" 3GPP TSG RAN WG1 Meeting #100-Bis-e, R1-2002552, Apr. 30, 2020 (8 pages).

Samsung, "Multi-beam enhancements" 3GPP TSG RAN WG1 #102-e, R1-2006991, Aug. 28, 2020, e-Meeting (15 pages).

Samsung: "View on Further Enhancements on MIMO for NR" 3GPP TSG-RAN Meeting #88e; RP-200619; Jul. 3, 2020; Electronic Meeting (18 pages).

Sony, "Considerations on the enhancement of multi-beam operation" 3GPP TSG RAN WG1#102e, R1-2005560, Aug. 28, 2020, e-Meeting (10 pages).

ZTE, "Enhancements on beam management for multi-TRP" 3GPP TSG RAN WG1 Meeting #102-e, R1-2005457, Aug. 28, 2020, e-Meeting (11 pages).

ZTE, "Enhancements on Multi-beam Operation" 3GPP TSG RAN WG1 Meeting #102-e, R1-2005454, Aug. 28, 2020, e-Meeting (11 pages).

ZTE, "Preliminary views on further enhancement for NR MIMO" 3GPP TSG RAN WG1 Meeting #101-e, R1-2003483, Jun. 5, 2020, e-Meeting (18 pages).

Extended European Search Report for EP App. No. 20956987.0 dated Nov. 2, 2023 (12 pages).

International Search Report and Written Opinion for PCT Appl. No. PCT/CN2020/120566 mailed Jul. 9, 2021 (8 pages).

OPPO: "Enhancements on beam management for multi-TRP" 3GPP TSG RAN WG1 #102-e; R1-2005986; Aug. 18, 2020; e-Meeting (3 pages).

Samsung: "Issues on beam management" 3GPP TSG RAN WG1 Meeting AH 1801; R1-1800432; Jan. 26, 2018; Vancouver, Canada (12 pages).

ZTE, "Enhancements on multi-beam operation" 3GPP TSG RAN WG1 Meeting #96bis, R1-1904014, Apr. 12, 2019, Xi'an, China (17 pages).

* cited by examiner

ND TRACKING FOR HIGH MOBILITY
METHOD OF FAST BEAM REFINEMENT AND TRACKING FOR HIGH MOBILITY WIRELESS COMMUNICATION DEVICE

CROSS-REFERENCE TO RELATED APPLICATION

This application claims the benefit of priority under 35 U.S.C. § 120 as a continuation of PCT Patent Application No. PCT/CN2020/120566, filed on Oct. 13, 2020, the disclosure of which is incorporated herein by reference in its entirety.

TECHNICAL FIELD

The disclosure relates generally to wireless communications, including but not limited to systems and methods for fast beam refinement and/or tracking for high mobility wireless communication device.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a plurality of reference signals (RSs) from a wireless communication node. The wireless communication device may send a report of at least a first RS of the plurality of RSs to the wireless communication node. The wireless communication device may determine information corresponding to a signal according to the first RS.

In some embodiments, the signal may comprise at least one of: a physical downlink shared channel (PDSCH), a physical downlink control channel (PDCCH), a synchronization signal block (SSB), a channel state information reference signal (CSI-RS), a preamble random access channel (PRACH), a physical uplink control channel (PUCCH), a physical uplink shared channel (PUSCH) or a sounding reference signal (SRS). In some embodiments, the information may comprise at least one of: a transmission configuration indicator (TCI) state, a spatial relation, a quasi co-location (QCL) assumption, or a pathloss RS (PL-RS).

In some embodiments, the QCL assumption may correspond to at least one of QCL type A, QCL type B or QCL type C, and the first RS may be periodic or semi-persistent. In some embodiments, a reference RS corresponding to the first RS or that is QCLed (e.g., quasi co-located) with the first RS may be used for determining the TCI state, the spatial relation, the QCL assumption or the PL-RS of the signal. In some embodiments, the reference RS may be periodic, semi-persistent or a channel state information reference signal (CSI-RS) for tracking if the QCL assumption corresponds to QCL type A, QCL type B or QCL type C. In some embodiments, the first RS may be aperiodic if the QCL assumption corresponds to QCL type A, QCL type B or QCL type C. In some embodiments, the reference RS (e.g., corresponding to the first RS or that is QCLed with the first RS) can be periodic or semi-persistent. In some embodiments, the first RS may be aperiodic, periodic, or semi-persistent.

In some embodiments, the signal may not be configured with a transmission configuration indicator (TCI) state, a PL-RS or spatial relation. In some embodiments, a report may be a report of one or more RSs of the plurality of RSs. In some embodiments, if the report is a report of one or more RSs of the plurality of RSs, a transmission configuration indicator (TCI) indication in downlink control information (DCI) may indicate the first RS of the one or more RSs. In some embodiments, if the report is a report of one or more RSs of the plurality of RSs, the one or more RSs each may be associated with a respective one of TCI codepoints corresponding to a TCI field in the DCI. In some embodiments, if the report is a report of one or more RSs of the plurality of RSs, the first RS may be a RS that is ordered first within the report. In some embodiments, if the report is a report of one or more RSs of the plurality of RSs, the first RS may be associated with a lowest identifier (ID), a highest ID or a specific ID within the one or more RSs. In some embodiments, if the report is a report of one or more RSs of the plurality of RSs, the first RS may be associated with a same control resource set (CORESET) pool ID or a same group information as the signal.

In some embodiments, the wireless communication device may trigger a channel state information (CSI) triggering state by downlink control information (DCI), wherein the CSI triggering state can be associated with one or more RS resource sets. In some embodiments, the CSI triggering state may be associated with one or more CSI report configurations, each including one of the one or more RS resource sets. In some embodiments, the report may be carried by a physical uplink shared channel (PUSCH) scheduled by the DCI. In some embodiments, the report may be a report of at least one of the RSs from one of the one or more RS resource sets. In some embodiments, CSI-RS resources in the one or more RS resource sets may be associated with a same quasi co-location (QCL) assumption or QCLed. In some embodiments, a transmission configuration indicator (TCI) field of the DCI may indicate a quasi co-location (QCL) assumption or TCI state of the one or more RS resource sets, the one or more RS resource sets configured with repetition as "off".

In some embodiments, a first RS resource set of the one or more RS resource sets may comprise a synchronization signal block (SSB) or a CSI-RS that is periodic, semi-persistent or aperiodic. In some embodiments, the first RS resource set may be configured with repetition as "off" if the first RS resource set includes the CSI-RS. In some embodiments, the report may correspond to a first RS resource set of the one or more RS resource sets, and is carried in a physical uplink shared channel (PUSCH) scheduled by the DCI. In some embodiments, the signal may comprise at least one RS resource in a second RS resource set of the one or more RS resource sets. In some embodiments, the wireless communication device may determine information corresponding to the at least one RS resource, according to the first RS that is associated with a first RS resource set of the one or more RS resource sets.

In some embodiments, beam switching timing may only be applied to the first RS resource set. In some embodiments, an offset for the second RS resource set can be based on a time unit of the report or a time unit of the DCI. In some embodiments, the second RS resource set may be configured with repetition as "on" when the second RS resource set includes the CSI-RS. In some embodiments, a second RS resource set of the one or more RS resource sets may have no associated reporting. In some embodiments, a report quantity corresponding to the second RS resource set may be 'none'. In some embodiments, a minimum time gap between a first RS resource set of the one or more RS resource sets and a second RS set of the one or more RS resource sets may be predefined or based on a capability of the wireless communication device. In some embodiments, a minimum time gap between the report and a second RS resource set of the one or more RS resource sets may be predefined or based on a capability of the wireless communication device.

In some embodiments, the signal may comprise one or more sounding RS (SRS) resources. In some embodiments, a command may be used to trigger a channel state information (CSI) triggering state and a request for the one or more SRS resources. In some embodiments, the CSI triggering state may be associated with one or more RS resource sets. In some embodiments, the DCI may include the command, wherein a CSI triggering state triggered by the DCI is associated with the SRS request. In some embodiments, an offset for SRS may be based on a time unit of a RS resource set or a time unit of a report corresponding to the CSI report configuration. In some embodiments, at least one of the one or more SRS resources may be on a quasi-co beam as the first RS. In some embodiments, the at least one of the one or more SRS resources may have a same or similar at least one of spatial parameter or precoding parameter as the first RS. In some embodiments, a minimum time gap between a resource or a set of the one or more RS resource sets and at least one of the one or more SRS resources may be predefined or based on a capability of the wireless communication device. In some embodiments, a minimum time gap between the report and the SRS may be predefined or based on the capability of the wireless communication device. In some embodiments, the SRS may be configurable as a reference RS in a transmission configuration indicator (TCI) state which can be applied for both uplink and downlink signals. In some embodiments, a usage of the SRS may be configured as beam management.

In some embodiments, a repetition parameter may be associated with the one or more SRS resources. In some embodiments, the one or more SRS resources may be transmitted with a same spatial filter when the repetition parameter is configured as "on". In some embodiments, the one or more SRS resources may be transmitted with different spatial filters when the repetition parameter is configured as "off". In some embodiments, the one or more SRS resources may be transmitted with different spatial filters. In some embodiments, the wireless communication device may send a report indicative of a number of channel state information reference signal (CSI-RS) or sounding reference signal (SRS) resources to the wireless communication node.

In some embodiments, the wireless communication device may send the report indicative of a number of CSI-RS or SRS resources for a first mode with a reference RS, or for a second mode without the reference RS, to the wireless communication node. In some embodiments, the reference RS may correspond to a spatial relation, a spatial filter or a spatial parameter. In some embodiments, the wireless communication device may send a request for a procedure of CSI-RS or SRS transmission. In some embodiments, the wireless communication device may send the report indicative of the number of CSI-RS or SRS resources corresponding to the procedure, via capability reporting, to the wireless communication node. In some embodiments, a CSI-RS may be configured with a repetition parameter of "on". In some embodiments, a usage of a SRS may be configured as "beam management".

At least one aspect is directed to a system, method, apparatus, or a computer-readable medium. A wireless communication node may send a plurality of reference signals (RSs) to a wireless communication device. The wireless communication node may receive a report of at least a first RS of the plurality of RSs from the wireless communication device. The wireless communication device may determine information corresponding to a signal according to the first RS.

In some embodiments, the signal may comprise at least one of: a physical downlink shared channel (PDSCH), a physical downlink control channel (PDCCH), a synchronization signal block (SSB), a channel state information reference signal (CSI-RS), a preamble random access channel (PRACH), a physical uplink control channel (PUCCH), a physical uplink shared channel (PUSCH) or a sounding reference signal (SRS). In some embodiments, the information may comprise at least one of: a transmission configuration indicator (TCI) state, a spatial relation, a quasi co-location (QCL) assumption, or a pathloss RS (PL-RS).

In some embodiments, the QCL assumption may correspond to at least one of QCL type A, QCL type B or QCL type C, and the first RS may be periodic or semi-persistent. In some embodiments, a reference RS corresponding to the first RS or that is QCLed with the first RS may be used for determining the TCI state, the spatial relation, the QCL assumption or the PL-RS of the signal. In some embodiments, the reference RS may be periodic, semi-persistent or a channel state information reference signal (CSI-RS) for tracking if the QCL assumption corresponds to QCL type A, QCL type B or QCL type C. In some embodiments, the first RS may be aperiodic if the QCL assumption corresponds to QCL type A, QCL type B or QCL type C. In some embodiments, the reference RS (e.g., corresponding to the first RS or that is QCLed with the first RS) can be periodic or semi-persistent. In some embodiments, the first RS may be aperiodic, periodic, or semi-persistent.

In some embodiments, the signal may not be configured with a transmission configuration indicator (TCI) state, a PL-RS or spatial relation. In some embodiments, a report may be a report of one or more RSs of the plurality of RSs. In some embodiments, if the report is a report of one or more RSs of the plurality of RSs, a transmission configuration indicator (TCI) indication in downlink control information (DCI) may indicate the first RS of the one or more RSs. In some embodiments, if the report is a report of one or more RSs of the plurality of RSs, the one or more RSs each may be associated with a respective one of TCI codepoints corresponding to a TCI field in the DCI. In some embodiments, if the report is a report of one or more RSs of the plurality of RSs, the first RS may be a RS that is ordered first within the report. In some embodiments, if the report is a report of one or more RSs of the plurality of RSs, the first RS may be associated with a lowest identifier (ID), a highest ID or a specific ID within the one or more RSs. In some embodiments, if the report is a report of one or more RSs of the plurality of RSs, the first RS may be associated with a same control resource set (CORESET) pool ID or a same group information as the signal.

In some embodiments, the wireless communication node may trigger a channel state information (CSI) triggering state by downlink control information (DCI), wherein the CSI triggering state can be associated with one or more RS resource sets. In some embodiments, the CSI triggering state may be associated with one or more CSI report configurations, each including one of the one or more RS resource sets. In some embodiments, the report may be carried by a physical uplink shared channel (PUSCH) scheduled by the DCI. In some embodiments, the report may be a report of at least one of the RSs from one of the one or more RS resource sets. In some embodiments, CSI-RS resources in the one or more RS resource sets may be associated with a same quasi co-location (QCL) assumption or QCLed. In some embodiments, a transmission configuration indicator (TCI) field of the DCI may indicate a quasi co-location (QCL) assumption or TCI state of the one or more RS resource sets, the one or more RS resource sets configured with repetition as "off".

In some embodiments, a first RS resource set of the one or more RS resource sets may comprise a synchronization signal block (SSB) or a CSI-RS that is periodic, semi-persistent or aperiodic. In some embodiments, the first RS resource set may be configured with repetition as "off" if the first RS resource set includes the CSI-RS. In some embodiments, the report may correspond to a first RS resource set of the one or more RS resource sets, and is carried in a physical uplink shared channel (PUSCH) scheduled by the DCI. In some embodiments, the signal may comprise at least one RS resource in a second RS resource set of the one or more RS resource sets. In some embodiments, the wireless communication node may cause the wireless communication device to determine information corresponding to the at least one RS resource, according to the first RS that is associated with a first RS resource set of the one or more RS resource sets.

In some embodiments, beam switching timing may only be applied to the first RS resource set. In some embodiments, an offset for the second RS resource set can be based on a time unit of the report or a time unit of the DCI. In some embodiments, the second RS resource set may be configured with repetition as "on" when the second RS resource set includes the CSI-RS. In some embodiments, a second RS resource set of the one or more RS resource sets may have no associated reporting. In some embodiments, a report quantity corresponding to the second RS resource set may be 'none'. In some embodiments, a minimum time gap between a first RS resource set of the one or more RS resource sets and a second RS set of the one or more RS resource sets may be predefined or based on a capability of the wireless communication device. In some embodiments, a minimum time gap between the report and a second RS resource set of the one or more RS resource sets may be predefined or based on a capability of the wireless communication device.

In some embodiments, the signal may comprise one or more sounding RS (SRS) resources. In some embodiments, a command may be used to trigger a channel state information (CSI) triggering state and a request for the one or more SRS resources. In some embodiments, the CSI triggering state may be associated with one or more RS resource sets. In some embodiments, the DCI may include the command, wherein a CSI triggering state triggered by the DCI is associated with the SRS request. In some embodiments, an offset for SRS may be based on a time unit of a RS resource set or a time unit of a report corresponding to the CSI report configuration. In some embodiments, at least one of the one or more SRS resources may be on a quasi-co beam as the first RS. In some embodiments, the at least one of the one or more SRS resources may have a same or similar at least one of spatial parameter or precoding parameter as the first RS. In some embodiments, a minimum time gap between a resource or a set of the one or more RS resource sets and at least one of the one or more SRS resources may be predefined or based on a capability of the wireless communication device. In some embodiments, a minimum time gap between the report and the SRS may be predefined or based on the capability of the wireless communication device. In some embodiments, the SRS may be configurable as a reference RS in a transmission configuration indicator (TCI) state which can be applied for both uplink and downlink signals. In some embodiments, a usage of the SRS may be configured as beam management.

In some embodiments, a repetition parameter may be associated with the one or more SRS resources. In some embodiments, the one or more SRS resources may be transmitted with a same spatial filter when the repetition parameter is configured as "on". In some embodiments, the one or more SRS resources may be transmitted with different spatial filters when the repetition parameter is configured as "off". In some embodiments, the one or more SRS resources may be transmitted with different spatial filters. In some embodiments, the wireless communication node may receive a report indicative of a number of channel state information reference signal (CSI-RS) or sounding reference signal (SRS) resources from the wireless communication device.

In some embodiments, the wireless communication node may receive the report indicative of a number of CSI-RS or SRS resources for a first mode with a reference RS, or for a second mode without the reference RS, from the wireless communication device. In some embodiments, the reference RS may correspond to a spatial relation, a spatial filter or a spatial parameter. In some embodiments, the wireless communication node may receive a request for a procedure of CSI-RS or SRS transmission. In some embodiments, the wireless communication node may receive the report indicative of the number of CSI-RS or SRS resources corresponding to the procedure, via capability reporting, to the wireless communication node. In some embodiments, a CSI-RS may be configured with a repetition parameter of "on". In some embodiments, a usage of a SRS may be configured as "beam management".

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
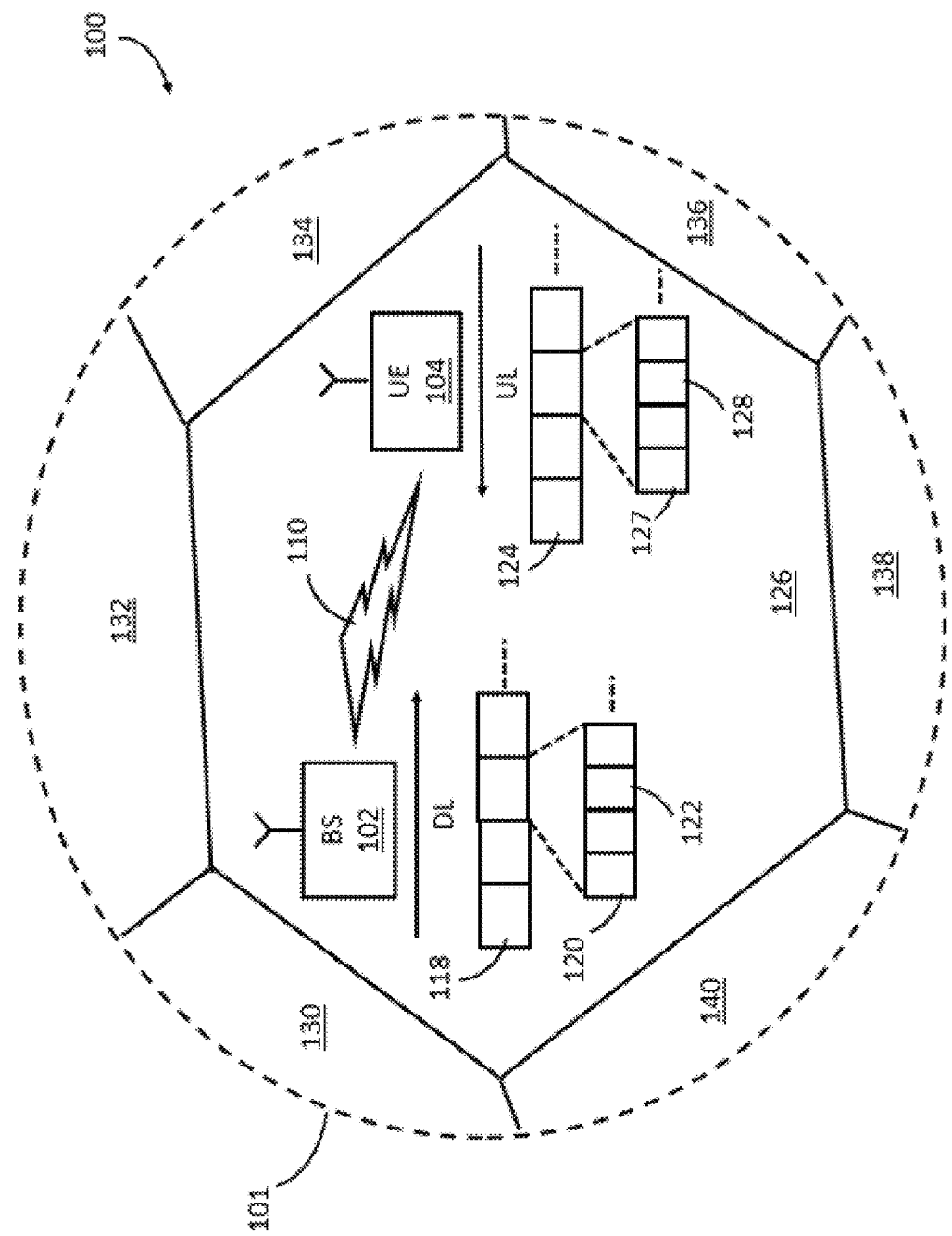
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
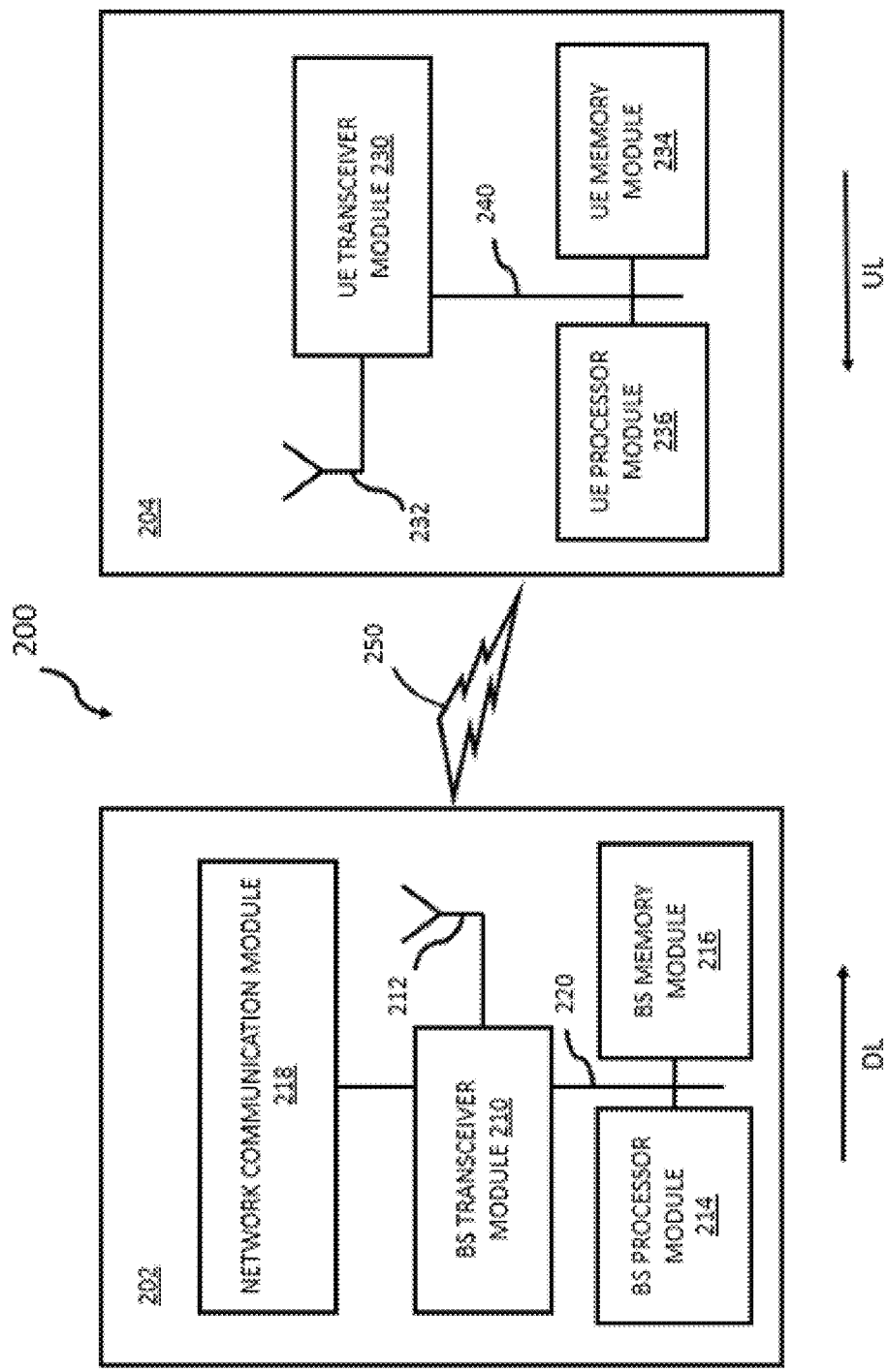
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Fast Beam Refinement and/or Tracking for High Mobility Wireless Communication Device In certain systems (e.g., 5G new radio (NR) and/or other systems), mobile communication methods/procedures may use/implement/enable analog beam-forming techniques. Analog beam-forming may facilitate/increase/enhance the robustness of high-frequency communications and/or processes. In some embodiments, quasi co-location (QCL) state and/or transmission configuration indicator (TCI) state may support/enable/facilitate beam indication for one or more types of channels and/or signals. For example, QCL state and/or TCI state may support beam indication for downlink (DL) control channels (e.g., physical downlink control channel (PDCCH) and/or other channels), DL data channels (e.g., physical downlink shared channel (PDSCH) and/or other channels), and/or reference signals (e.g., channel state information reference signaling (CSI-RS) and/or other types of signals). In some embodiments, spatial relation information (e.g., higher layer parameters, such as spatialRelationInfo, and/or other parameters) may support/enable/facilitate beam indication for one or more types of channels and/or signals. For instance, spatial relation information (and/or other information) may support beam indication for uplink (UL) control channels (e.g., physical uplink control channel (PUCCH)), reference signals (e.g., sounding reference signal (SRS)), and/or other types of channels/signals. For UL data channels (e.g., physical uplink shared channel (PUSCH) and/or other channels), beam indication can be achieved/implemented/enabled by mapping one or more SRS resources and/or one or more ports of an UL data channel. A wireless communication node (e.g., a ground terminal, a base station, a gNB, an eNB, or a serving node) may indicate/specify the one or more SRS resources. Therefore, a configuration of the beam for an UL data channel (or other channels) may be derived/determined/obtained by using the spatial relation information. The spatial relation information can be associated/related/linked with one or more SRS resources and/or ports of the UL data channel.

Certain systems (e.g., 5G NR and/or other systems) may be designed/configured/developed under the assumption of user equipment (UE) random mobility. For instance, in certain frequency ranges (e.g., frequency range (FR) 2), UE mobility can be average and/or low (e.g., 30 km/h for outdoor settings and/or 3 km/h for indoor settings). In certain specifications, one or more solutions (e.g., 5G NR solution) may use/implement/execute independent procedures for reporting one or more beams (e.g., channel state information (CSI)+reference signal received power (RSRP), and/or synchronization signal block resource indicator (SSBRI)+RSRP) and/or indicating a TCI and/or spatial relation information (e.g., handled by a gNB command). In some embodiments, beam reporting and/or TCI (and/or spatial relation information) indication may be decoupled/unrelated/unassociated procedures. Therefore, TCI (and/or spatial relation information) indication may be flexibly performed for subsequent data scheduling, regardless/independent of a beam reporting operation. Reporting one or more beams and/or indicating a TCI (and/or spatial relation information) may introduce/involve a certain amount of latency.

In certain applications, the current level of flexibility of certain configurations (e.g., beam reporting and/or TCI indication) may be unable to support UE high mobility (e.g., the effectiveness for UE high mobility decreases/degrades). In some embodiments (e.g., high mobility scenarios), a speed/rate of a wireless communication device (e.g., a UE, a terminal, or a served node) can be high/elevated (e.g., 350 km/h and/or other values of speed). If the speed of a wireless communication device (e.g., UE) is high (e.g., exceeds certain values of speed), a corresponding time of beam dwelling may decrease/shorten (e.g., by 10 ms and/or other length of time). When the beam dwelling time decreases (e.g., in UE high mobility scenarios), the latency (e.g., 14 ms and/or other time instances) introduced by beam reporting and/or TCI (and/or spatial relation information) indication may become problematic.

The systems and methods presented herein include a novel approach for achieving/improving/enhancing fast beam refinement and/or beam tracking for UE high mobility (e.g., improving by at least 25%, 35%, 45%, or other percent) by using predictive beam measurements, joint beam reporting, and/or joint beam indication. The system and methods presented herein may consider/contemplate/address one or more of the following issues/challenges:

1) DL beam refinement: In DL beam refinement, one or more wireless communication node (e.g., gNB) candidate Tx beams and/or one or more wireless communication device candidate (e.g., UE) receive (Rx) beams may exist. In certain systems (e.g., 5G NR), the wireless communication device may perform/execute a plurality of steps, wherein the steps can include probing the Tx beams, reporting the Tx beam(s), indicating at least one new Tx beam, and/or sweeping the Rx beams along with the indicated Tx beam(s). The number of steps of the plurality of steps can be reduced/decreased/compressed to reduce/decrease/save latency. For example, the relationship between beam reporting and Rx beam sweeping (along with the reported beam) may be explored/considered/analyzed to reduce the latency.

2) DL and UL beam refinement: One or more of the issues/challenges of DL beam refinement may apply in DL and UL beam refinement. Certain systems (e.g., 5G NR) and/or solutions may execute/perform independent DL and UL beam refinement procedures. The systems and methods presented herein may reduce/decrease the number of steps of beam indication for UL beam refinement. In some embodiments, the systems and methods presented herein may consider UL beam sweeping with DL Tx beam reporting.

3) In some embodiments, one or more techniques/procedures for DL beam refinement and/or DL and UL beam refinement can be extended/enhanced/improved to include scenarios with simultaneous DL multi-beam transmissions (e.g., for multiple transmit/transmission receive points (mTRP)) and/or group based reporting.

In certain systems, the use of high frequency resources may induce/produce/cause a considerable propagation loss. Therefore, wide and/or ultra-wide spectrum resources may pose/introduce/cause noticeable challenges (e.g., due to propagation loss). In some embodiments, certain technologies/techniques may achieve/cause beam alignment and/or obtain/cause sufficient antenna gain. For example, antenna arrays and/or beam-forming training techniques that use massive multiple-input multiple-output (MIMO) (e.g., up to 1024 antenna elements for one node) may achieve beam alignment and/or sufficient antenna gain. In some embodiments, analog phase shifters may be used to implement/enable mmWave beam-forming. Using analog phase shifters may result in a low cost of implementation with the benefits of using antenna arrays. If analog phase shifters are used (e.g., to implement mmWave beam-forming), the number of controllable phases may be finite/defined/restricted. In some embodiments, the use of analog phase shifters may place/cause one or more constant modulus constraints on the analog phase shifters. Given a set of one or more pre-specified beam patterns, the goal/target of variable-phase-shift-based beamforming (BF) training may correspond to identifying/determining the optimum beam pattern for subsequent data transmissions. The identified beam pattern may apply to one or more scenarios with one TRP and/or one panel (e.g., a UE with one panel).

Figure 3:
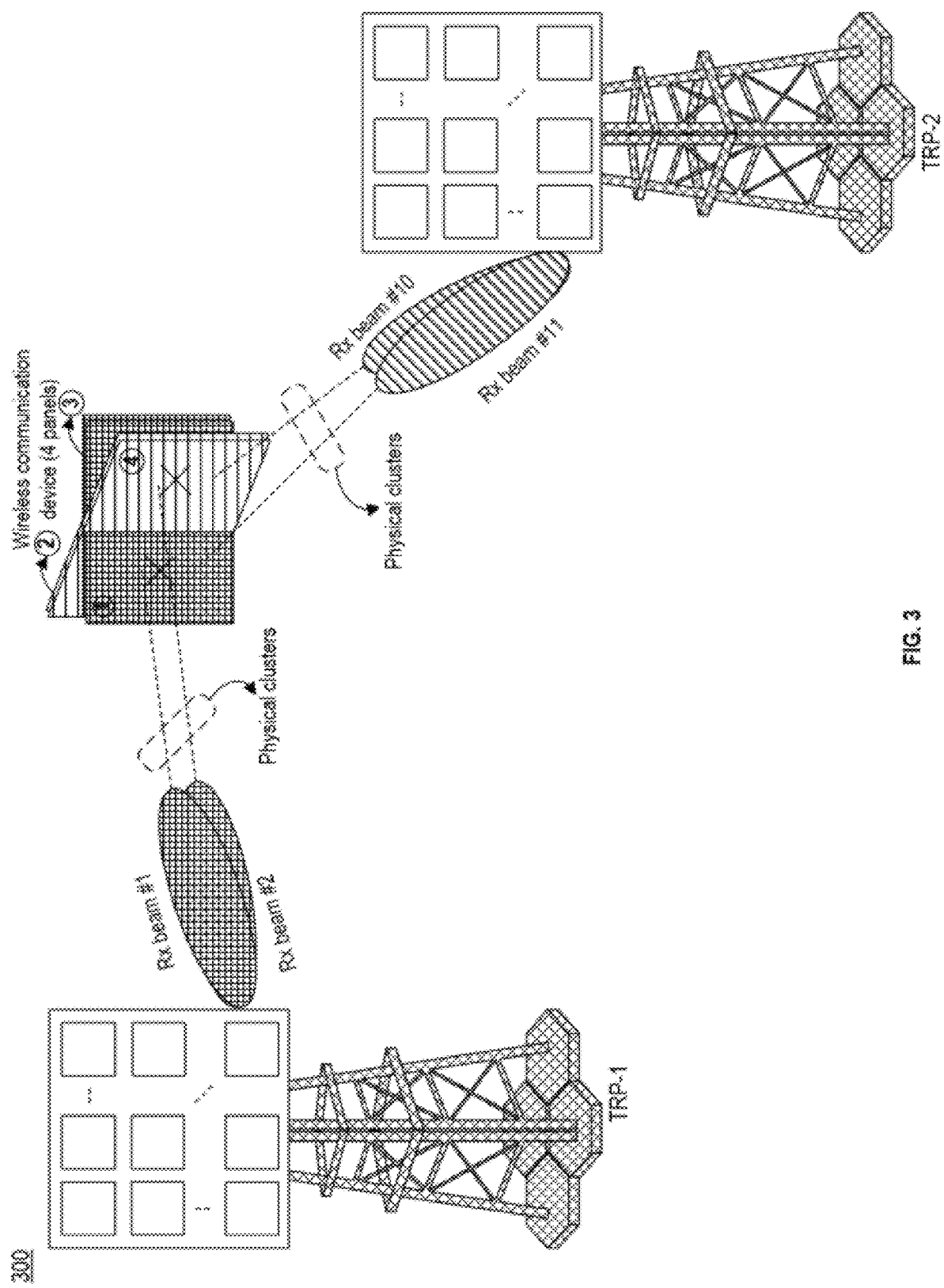
FIG. 3 illustrates example approaches for beam measurement and/or beam reporting with a wireless communication device, in accordance with some embodiments of the present disclosure.

Referring now to FIG. 3, depicted is an example approach 300 for beam measurement and/or beam reporting with a wireless communication device (e.g., UE), wherein the wireless communication device uses one or more panels (e.g., panel 1, panel 2, panel 3, panel 4, and/or other panels). Certain systems (e.g., beyond 5G gNB and/or next generation communication systems) may consider/contemplate one or more scenarios with mTRP (e.g., TRP-1, TRP-2, and/or other TRPs) and/or one or more panels. A wireless communication device (e.g., a UE) may use more than one panel (e.g., four panels) to enhance/improve coverage by covering a larger space. In some embodiments, a panel of a TRP and/or a panel of a wireless communication device may have at least two transceiver units (TXRUs). The at least two TXRUs may be associated/related with cross polarization accordingly. In some embodiments, the TRP (e.g., TRP-1, TRP-2, and/or other TRPs) and/or wireless communication device (e.g., UE) may use different/distinct/separate beams (e.g., Rx beam #1, Rx beam #2, Rx beam #10, Rx beam #11, and/or other beams), generated with one or more panels, to achieve high rank and/or perform multi-layer transmissions (e.g., simultaneous transmission across multiple panels (STxMP)). The TRP and/or wireless communication device may utilize different beams to achieve an efficient usage of the capability of each panel and/or the associated TXRUs of each panel.

Figure 4:
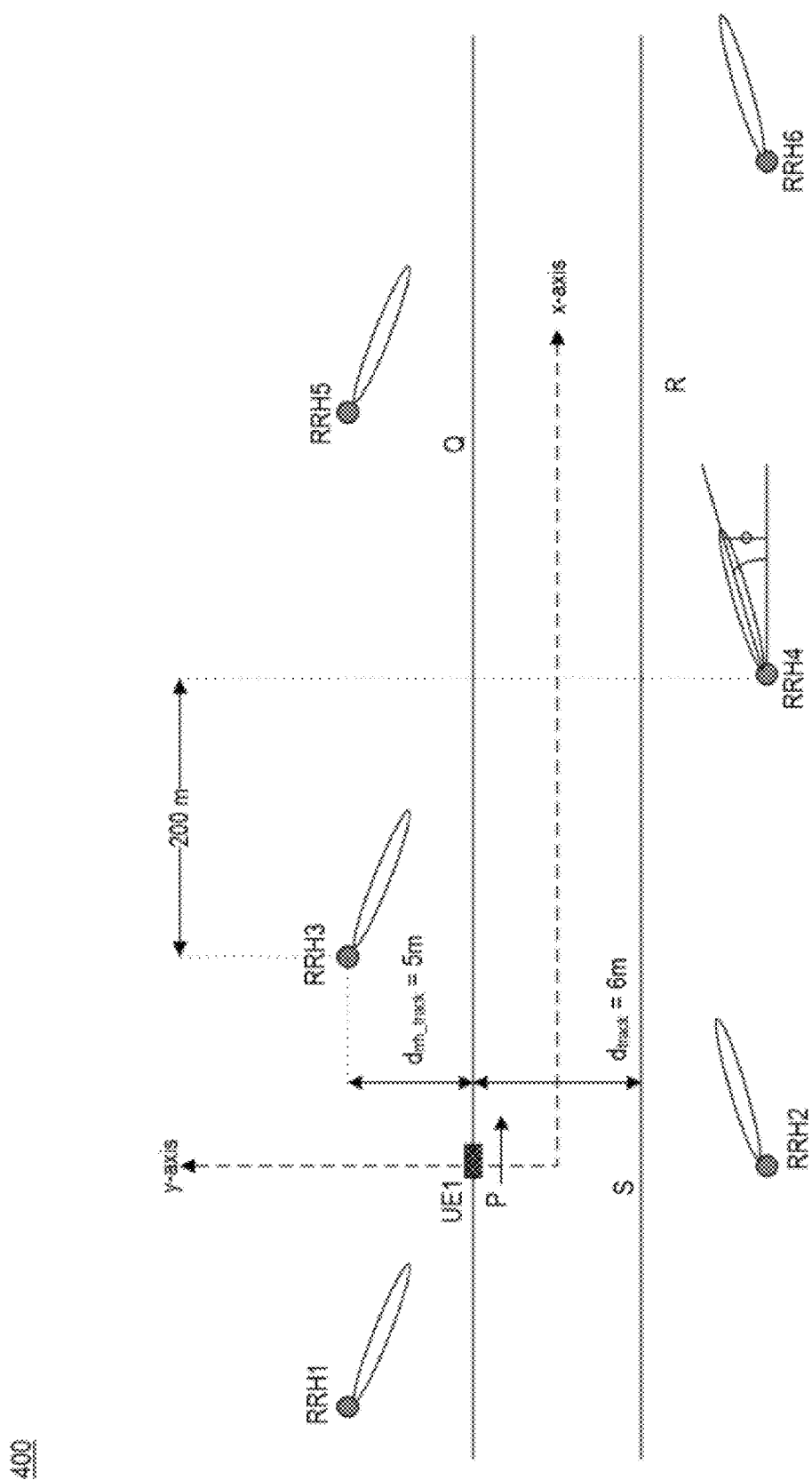
FIG. 4 illustrates an example scenario with a high-speed vehicle (e.g., train) and one or more remote radio heads (RRHs), in accordance with some embodiments of the present disclosure.
Figure 5:
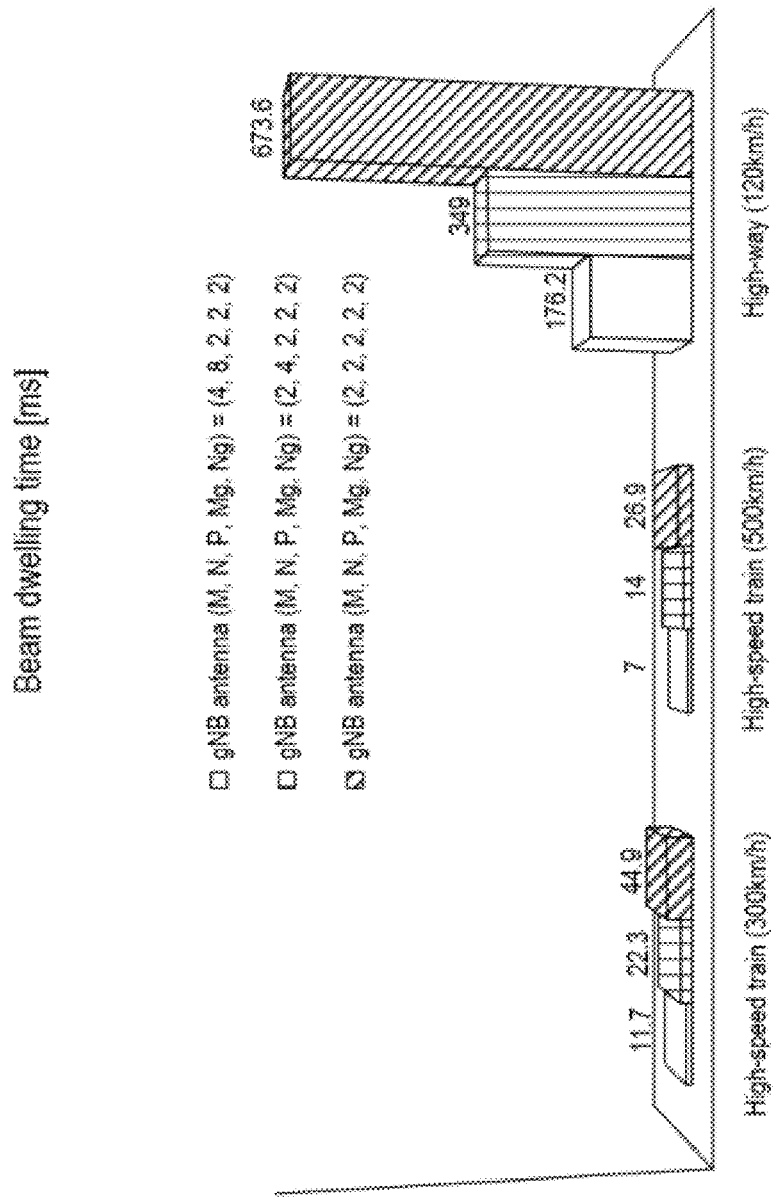
FIG. 5 illustrates example measurements of beam dwelling time for a given wireless communication node antenna configuration, in accordance with some embodiments of the present disclosure.

Referring now to FIG. 4, depicted is an example scenario 400 with a high-speed vehicle (e.g., a train) and one or more remote radio heads (RRHs), e.g., TRPs. The example scenario may include six (or other numbers) RRHs (e.g., RRH1, RRH2, RRH3, RRH4, RRH5, RRH6, and/or other RRHs). The distance between two RRHs (e.g., RRH3 and RRH4) may be 200 meters (or other numbers), while the distance between the railway of the train (e.g., UE1) and at least one RRH ($d_{rrh\_track}$) may be 5 meters (or other numbers). One or more RRHs may correspond to a same cell (e.g., save handover procedure), which produces/generates/emulates a long narrow cell along the railway. One or more TRPs may be deployed alongside a highway in an example scenario of a vehicle in the highway, Referring now to FIG. 5, depicted are example measurements 500 of beam dwelling time for a given wireless communication node (e.g., gNB) antenna configuration. The beam dwelling time of the wireless communication node may include a beam dwelling time of a high-speed train (or other vehicles) traveling at 300 km/h, a high-speed train traveling at 500 km/h, and/or a vehicle in a highway traveling at a speed of 120 km/h. The beam dwelling time may be dependent/based/determined by one or more factors. The one or more factors may include the speed of the wireless communication device, the distance between the wireless communication node and the wireless communication device, the width of the beam(s), and/or other factors. In some embodiments, the beam dwelling time may be as small as 7 ms (or other numbers). Current beam management procedures/processes (e.g., beam reporting, beam group activation, and/or beam indication) may fail to update a beam within the smallest value of beam dwelling time (e.g., 7 ms and/or other time instances).

In some embodiments, a beam state may correspond/refer to a QCL state, a TCI state, a spatial relation state (or spatial relation information state), a reference signal (RS), a spatial filter, and/or pre-coding. Specifically:

a) A Tx beam may correspond/refer to a QCL state, a TCI state, a spatial relation state, a DL/UL reference signal (e.g., a CSI-RS, a synchronization signal block (SSB) or SS/PBCH, a demodulation reference signal (DMRS), a sounding reference signal (SRS), a physical random access channel (PRACH), and/or other signals), a Tx spatial filter, and/or Tx precoding.

b) A Rx beam may correspond/refer to a QCL state, a TCI state, a spatial relation state, a spatial filter, a Rx spatial filter, and/or Rx precoding.

c) A beam identifier (ID) may correspond/refer to a QCL state index, a TCI state index, a spatial relation state index, a reference signal index, a spatial filter index, a precoding index, and/or other indices.

In some embodiments, the spatial filter may correspond to the perspective of the wireless communication device and/or the wireless communication node. In some embodiments, the spatial filter may refer to a spatial-domain filter and/or other filters.

In some embodiments, a spatial relation information may comprise one or more reference RSs. The spatial relation information may be used to specify/indicate/convey/represent the spatial relation between a targeted RS/channel and the one or more reference RSs. In some embodiments, a spatial relation may refer to one or more same/quasi-co beams, one or more same/quasi-co spatial parameters, and/or one or more same/quasi-co spatial filters. In some embodiments, a spatial relation may refer to a beam, a spatial parameter, and/or a spatial filter.

In some embodiments, a QCL state may comprise one or more reference RSs and/or one or more corresponding QCL type parameters. The QCL type parameters may include at least one of a Doppler spread, a Doppler shift, a delay spread, an average delay, an average gain, and/or a spatial parameter (e.g., a spatial Rx parameter). In some embodiments, a TCI state may correspond/refer to a QCL state. In some embodiments, a QCL Type A may include a Doppler shift, a Doppler spread, an average delay, and/or a delay spread. In some embodiments, a QCL Type B may include a Doppler shift and/or Doppler spread. In some embodiments, a QCL Type C may include a Doppler shift and/or an average delay. In some embodiments, a QCL Type D may include a spatial Rx parameter. In some embodiments, an UL signal may include/comprise a PRACH, a PUCCH, a PUSCH, a SRS, and/or other channels/signals. In some embodiments, a DL signal may include/comprise a PDCCH, a PDSCH, a SSB, a CSI-RS, and/or other channels/signals. In some embodiments, group based reporting may comprise at least one of beam group based reporting and/or antenna group based reporting.

In some embodiments, a beam group may refer to one or more distinct Tx beams of one group that are simultaneously received and/or transmitted. In some embodiments, a beam group may refer to one or more Tx beams of one or more different groups that may not be received and/or transmitted simultaneously. Furthermore, the definition of a beam group may correspond to the perspective of the wireless communication device. In some embodiments, an antenna group may refer to one or more distinct Tx beams of one group that may not be received and/or transmitted simultaneously. In some embodiments, an antenna group may refer to one or more Tx beams of one or more distinct groups that are simultaneously received and/or transmitted.

a) Furthermore, an antenna group may refer to at least N different/distinct Tx beams of one group that may not be received and/or transmitted simultaneously. An antenna group may refer to up to N different Tx beams of one group that are simultaneously received and/or transmitted. In some embodiments, N may be a positive integer.

b) Furthermore, an antenna group may refer to one or more Tx beams of one or more different groups that are simultaneously received and/or transmitted.

In some embodiments, the definition of an antenna group may correspond to the perspective of the wireless communication device. In some embodiments, an antenna group may correspond to an antenna port group, panel, and/or wireless communication device (e.g., UE) panel. In some embodiments, antenna group switching may correspond/refer to panel switching.

In some embodiments, group information may correspond to information grouping of one or more reference signals. In some embodiments, group information may include a resource set, a panel, a sub-array, an antenna group, an antenna port group, a group of antenna ports, a beam group, a transmission entity/unit and/or a reception entity/unit. In some embodiments, group information may represent/specify/indicate a wireless communication device (e.g., UE) panel and/or one or more features of the wireless communication device panel. In some embodiments, group information may refer to a group state and/or group ID.

In some embodiments, a time unit may include a sub-symbol, a symbol, a slot, a sub frame, a frame, a transmission occasion, and/or other time instances. In some embodiments, an active antenna group may correspond to an active DL antenna group, an active UL antenna group, an active DL and UL antenna group, and/or other groups. In some embodiments, a UL power control parameter may include a target power (P0), a path loss RS (e.g., a coupling loss RS), a scaling factor for path loss (e.g., alpha), and/or a closed loop process.

A. Embodiment 1: General Description for Associating Beam Reporting and Beam Indication For group and/or non-group based reporting, a wireless communication device may report/indicate/specify/provide one or more candidate beams and/or a corresponding channel state quality (e.g., RSRP and/or signal-to-interference-plus-noise ratio (SINR)). Responsive to receiving/obtaining the report(s), the wireless communication node may perform beam indication specify one or more candidate beams for a subsequent data transmission. In some embodiments, the wireless communication device may perform beam indication to specify further beam refinement. Therefore, beam reporting and beam indication may be unassociated/unrelated processes (e.g., up to gNB configuration). In UE high mobility scenarios, beam indication and/or beam reporting may cause/introduce increased latency. The increased latency may degrade/deteriorate/affect the performance of a transmission. The system and methods presented herein include one or more methods of associating beam reporting and beam indication.

In some embodiments, a report instance may carry/include/provide/specify one or more RSs. The RS(s) of the report instance may be used to determine a TCI state, a spatial relation, and/or a QCL assumption of a signal (e.g., a UL signal, a DL signal, and/or other signals).

The QCL assumption may correspond to a QCL Type D. In some embodiments, the RS(s) of the report instance may be used to determine/configure the QCL Type D assumption of an UL/DL signal (or other signals).

The QCL assumption may correspond to a QCL Type A, QCL Type B, and/or QCL Type C. In some embodiments, the RS(s) of the report instance may be used to determine/configure the QCL Type A, QCL Type B, and/or QCL Type C assumption of an UL/DL signal (or other signals).

In some embodiments, the RS(s) of the report instance may be periodic and/or semi-persistent.

A reference RS may correspond to the RS of the report instance (e.g., regarding the QCL assumption). In some embodiments, the reference RS may be QCLed with the reported RS. The reference RS may be used to determine/configure a TCI state, a spatial relation, and/or a QCL assumption of an UL/DL signal (or other signals).

In some embodiments, the reference RS may be periodic and/or a tracking reference signal (TRS). The QCL assumption may correspond to a QCL Type A, QCL Type B, and/or QCL Type C.

For example, a report instance may indicate/specify/report an aperiodic RS. The aperiodic SRS may include a QCL Type A RS in the TCI state of the aperiodic RS (e.g., the QCL Type A RS may correspond to a TRS). The QCL Type A RS may be used as a reference RS to determine the QCL Type A assumption of a UL/DL signal. The aperiodic RS can be used as a reference RS to determine the QCL Type D assumption of the UL/DL signal.

In another example, the reference RS may correspond to a reference RS of the reported RS regarding the QCL assumption. In yet another example, the reported RS may correspond to a reference RS of the reference RS regarding the QCL assumption.

In some embodiments, a report instance may carry/include/provide/specify one or more RSs. The RS(s) may be used to determine a pathloss RS (PL-RS) corresponding to an UL/DL signal (or other signals).

A reference RS may correspond/refer to the RS of the report instance (e.g., the reported RS). In some embodiments, the reference RS may be QCLed with the reported RS. The reference RS may be used to determine a PL-RS corresponding to the UL/DL signal.

In some embodiments, the reported RS and/or the reference RS may be periodic and/or semi-persistent.

In some embodiments, the UL/DL signal (or other signals) may not be configured with a TCI state, a PL-RS, and/or a spatial relation. In some embodiments, a report instance may report/specify/indicate one or more RSs. If one or more RSs are reported, a TCI indication in the DCI (e.g., scheduling an UL signal, such as a PUSCH and/or PUCCH) may indicate/specify/provide at least one RS of the one or more RSs. In some embodiments, the one or more reported RSs may be associated/related/linked with at least one TCI codepoint corresponding to the TCI field of the DCI (e.g., one by one in order).

In aperiodic reporting, at least one CSI triggering state may be associated/related with one or more RS resource sets. The one or more RSs (e.g., indicated by the report instance) may comprise one or more RS resource sets. In some embodiments, at least one CSI triggering state may be triggered/caused by the DCI. If the DCI triggers/causes at least one CSI triggering state, a report instance may carry/include/report/indicate/specify/provide one or more DL RSs (e.g., group based report) after performing at least one CSI measurement. In some embodiments, one or more DL RSs may be applied to one or more DL/UL signals.

In some embodiments, a PUSCH (and/or other UL channels) may carry/specify/provide the report instance(s). A same DCI that triggers an aperiodic beam reporting may schedule the PUSCH that carries the report instance(s). In some embodiments, at least one DL RS can be selected/identified from at least one RS resource set of the one or more RS resource sets. In some embodiments, one or more RS resources of one or more RS resource sets may be associated/related with a same QCL assumption and/or QCLed. In some embodiments, a triggered DCI may include/specify/indicate at least one TCI field. The TCI field of the triggered DCI may indicate/provide a QCL assumption and/or a TCI of the one or more RS resource sets. The one or more RS resource sets may be configured with repetition as "off".

For example, an aperiodic CSI report may provide/report/indicate/specify two (or other numbers of) DL RSs. Each DL RS of the reported DL RSs may be associated/related with at least one corresponding TCI state. A DCI may schedule the UL/DL signals (e.g., PUCCH, PDSCH, and/or other channels/signals). The DCI may specify/indicate at least one of the corresponding TCI states for transmission of the UL/DL signals.

Figure 6:
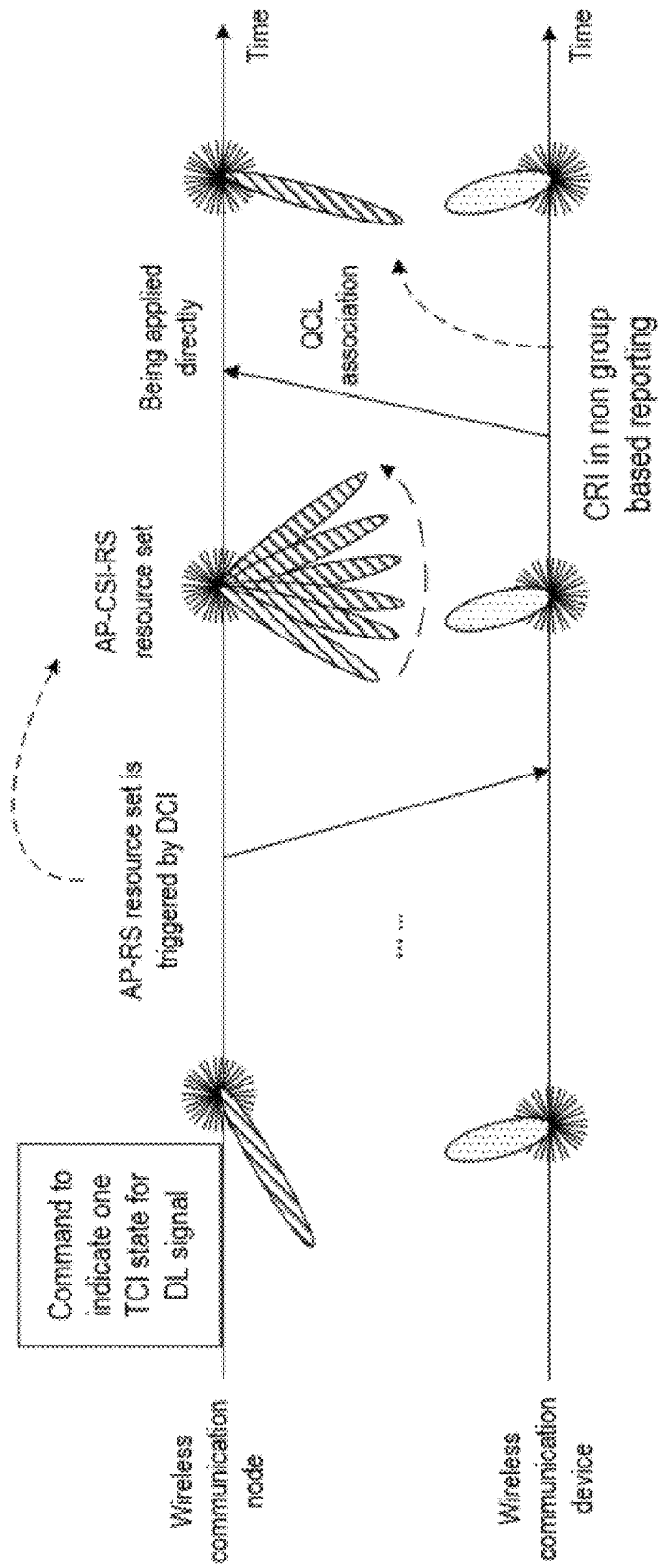
FIG. 6 illustrates example approaches for associating non-group based reporting and beam indication, in accordance with some embodiments of the present disclosure.

Referring now to FIG. 6, depicted is an example approach 600 for associating non-group based reporting and beam indication. In DL single beam transmissions, the wireless communication device (e.g., UE) may receive/obtain at least one command (e.g., DCI command) to indicate/specify/select at least one TCI state for one or more DL signals (e.g., PDSCH, PDCHH, CSI-RS, and/or other signals). The wireless communication device may receive the at least one command to schedule at least one UL transmission (e.g., PUSCH transmission and/or other transmissions). In some embodiments, an AP-CSI (aperiodic CSI) report may correspond to at least one AP-RS (aperiodic reference signal) resource set. A DCI (e.g., DCI format 0_1, DCI format 0_2, and/or other DCI formats) may trigger/cause the AP-CSI report. The resources of the AP-RS resource set may not be configured with a TCI state. A TCI state of a preceding command may indicate/specify/determine a QCL assumption of the resources of the AP-RS resource set. A PUSCH transmission (and/or other transmissions) may carry/indicate/specify a non-group based AP-CSI report. The non-group based AP-CSI report may include/indicate at least one CSI-RS resource. The at least one CSI-RS resource may be applied/used in one or more subsequent DL signals.

Figure 7:
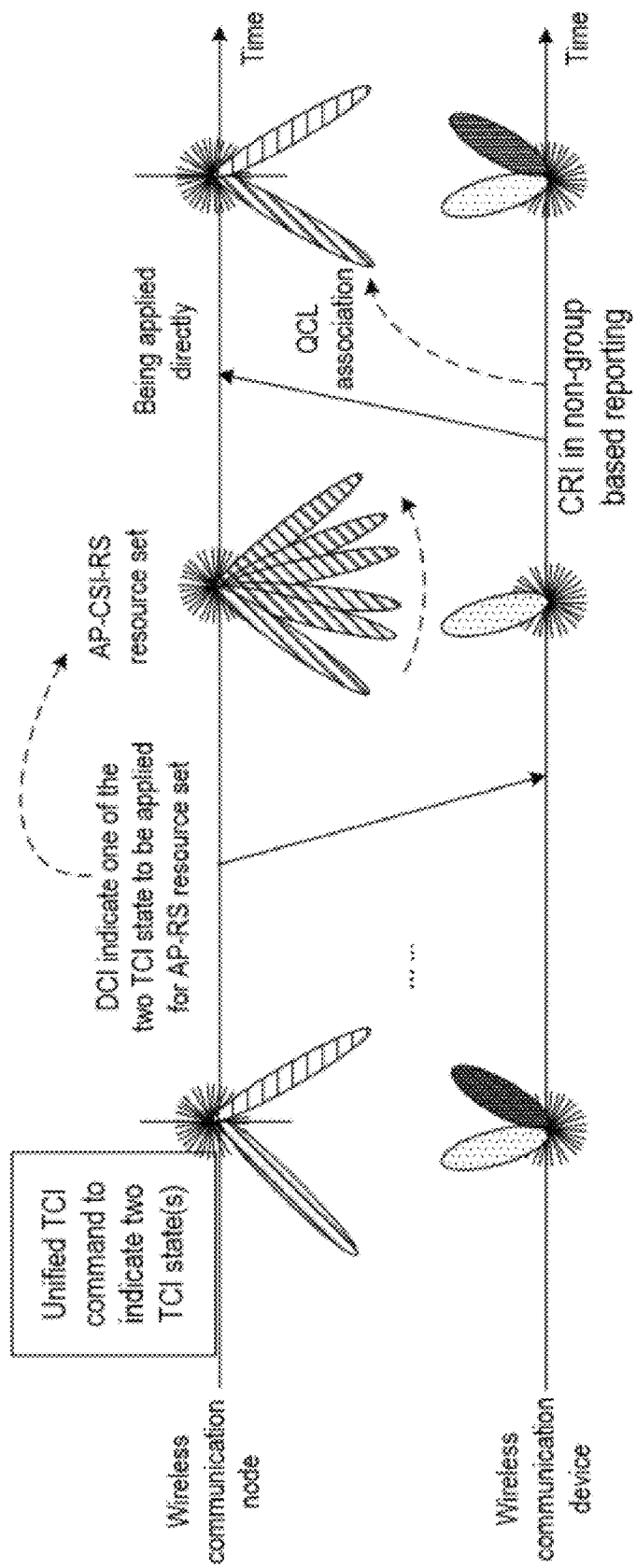
FIG. 7 illustrates example approaches for beam refinement of one or more downlink (DL) beams transmitted simultaneously, in accordance with some embodiments of the present disclosure.

Referring now to FIG. 7, depicted is an example approach 700 for beam refinement of one or more DL beams transmitted simultaneously. In DL multi-beam simultaneous transmissions, the wireless communication device may receive/obtain at least one command (e.g., DCI command). The at least one command may indicate/specify one or more TCI states (e.g., two TCI states and/or other numbers of TCI states) of a PDSCH (or other DL channels/signals). At least one TCI state of the one or more TCI states may be used for a PDCCH and/or CSI-RS based on a rule and/or command.

For example, at least one RS may be associated/related/linked with a lowest ID, a highest ID, and/or a specific ID among/within one or more RSs. In another example, at least one RS may be associated/related/linked with a same control resource set (CORESET) pool ID and/or group information (e.g., a beam group, a panel group, and/or antenna group of the wireless communication device) as a signal (e.g., PDSCH and/or other UL/DL signals). In some embodiments, at least one AP-CSI report may correspond to at least one AP-RS resource set. A DCI (e.g., DCI format 0_1, DCI format 0_2, and/or other DCIs with other formats) may trigger/cause the at least one AP-RS resource set. In some embodiments, one or more resources of the AP-RS resource set(s) may not be configured with a TCI state. The DCI may indicate/specify/provide at least one TCI of the one or more TCI states, wherein the indicated TCI(s) may be used for an AP-RS resource set. The CSI-RS resource indicated by a non-group based report may be applied to one or more subsequent DL signals.

B. Embodiment 2: Joint Procedure of Tx and Rx Beam Refinement and/or Beam Reporting In certain frequency ranges (e.g., FR2 and/or other frequency ranges), one or more Rx beams of a wireless communication device may be refined according to (or to address) the mobility of the wireless communication device (e.g., UE mobility). Additionally, one or more Tx beams of a wireless communication node (e.g., gNB) may be refined. The systems and methods presented herein include a joint procedure of AP-CSI triggering, wireless communication node Tx beam measurement, beam reporting, and/or wireless communication device Rx beam refinement. In some embodiments, at least one triggering state for CSI reporting may be associated with one or more (e.g., two or other numbers of) RS resource sets. The one or more RS resource sets may include a first RS resource set with a former transmission and/or a second RS resource set with a latter transmission.

- In some embodiments, a DCI may trigger/cause a CSI triggering state. The DCI may be related/associated/linked with one or more CSI report configurations. Each CSI report configuration of the one or more CSI report configurations may include at least one RS resource set.
- A first RS resource set may comprise at least one SSB and/or CSI-RS, wherein the SSB and/or CSI-RS can be periodic, semi-persistent, and/or aperiodic.
- A first RS resource set that includes one or more CSI-RSs may be configured with repetition as "off".
- A report instance may correspond to a first resource set, wherein a PUSCH (or other channels/signals) scheduled by a triggering DCI may carry/include the report instance.
- In some embodiments, a TCI state and/or QCL assumption of one or more CSI-RS resources in a second RS resource set may be determined/configured according to a reported RS. The reported RS may be associated/related/linked with a first RS resource set of the one or more RS resource sets.
  - In some embodiments, beam switching timing (e.g., timing requirements) may only be applied to the first RS resource set from the DCI.
  - In some embodiments, the offset for the second RS resource set can be based on a time unit of a reporting instance and/or a time unit of the triggering DCI.

In some embodiments, a second RS resource set may be configured with repetition as "on".

In some embodiments, a second RS resource set may have no associated reporting/report instance. A report quantity corresponding to the second RS resource may be set/configured as "none".

A minimum time gap between at least two RS resource sets may be determined by the capability of the wireless communication device. In some embodiments, the minimum time gap can be predetermined/predefined.

The minimum time gap between at least one CSI report and a second RS resource set may be determined by the capability of the wireless communication device. In some embodiments, the minimum time gap may be predetermined/predefined.

Figure 8:
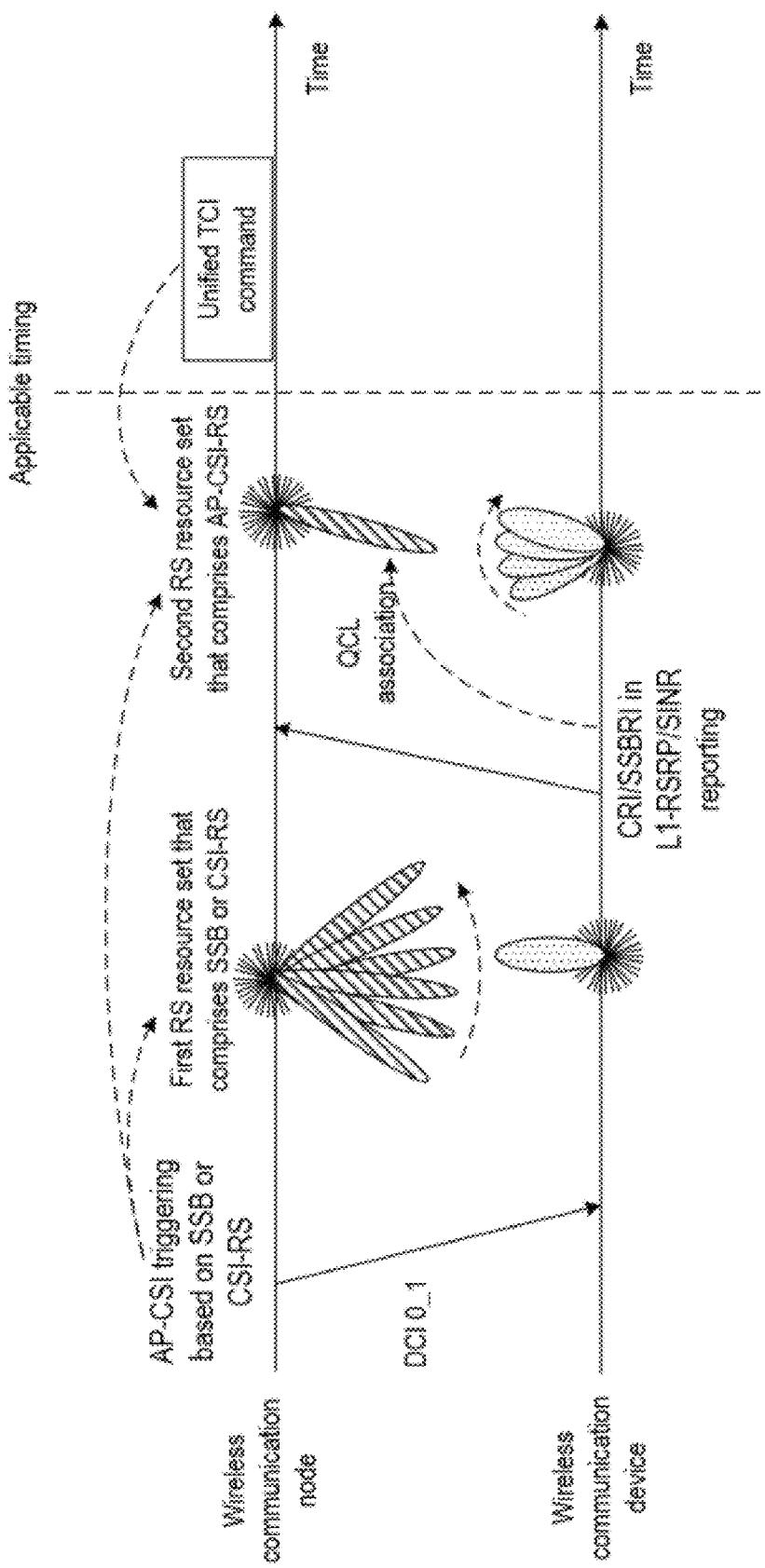
FIG. 8 illustrates example approaches for transmit (Tx)/receive (Rx) beam refinement and/or beam reporting for one or more DL transmissions, in accordance with some embodiments of the present disclosure.

Referring now to FIG. 8 depicted is an example approach 800 for Tx/Rx beam refinement and/or beam reporting for one or more DL transmissions. In some embodiments, a DCI may trigger/cause at least one CSI triggering state. The at least one CSI triggering state may be associated/related/linked with one or more report configurations (e.g., two report configurations). A first report configuration may comprise a first group/set of one or more CSI-RS and/or SSB resources. A second report configuration may comprise a second group/set of one or more CSI-RS resources. The CSI-RS and/or SSB resource(s) of the first report configuration may be sent/transmitted/broadcasted prior to the transmission of the CSI-RS resource(s) of the second report configuration. The wireless communication device (e.g., UE) may measure/quantify/evaluate the first group of one or more CSI-RS and/or SSB resources. Responsive to measuring the first group of CSI-RS and/or SSB resources, the wireless communication device may report/specify/indicate/send a corresponding report instance using a PUSCH (or other channels) scheduled by the DCI. The wireless communication node (e.g., gNB) may determine/assume a DL RS in the DCI corresponds to a reference RS. The wireless communication node may use the reference RS (e.g., DL RS in the DCI) to determine at least one QCL assumption for the second group of one or more CSI-RS resources. The wireless communication device may receive/obtain the second group of one or more CSI-RS resources. Responsive to receiving the second group of CSI-RS resources, the wireless communication device may refine the Rx beam (e.g., select the best beam direction of the Rx beam). In some embodiments, the AP-CSI-RS of the second resource set may be configured as a reference RS in a TCI state, wherein the TCI state is indicated accordingly.

C. Embodiment 3: Uplink Beam Refinement Across a Reference RS

A repetition parameter may be associated/related/linked with a set of SRS resources in order to achieve/perform/execute UL beam refinement. In some embodiments, the repetition parameter may be configured as "on" or "off". If the repetition parameter is configured as "on", one or more SRS resources of the set of SRS resources may be transmitted/send/broadcast using a same/corresponding spatial filter. If the repetition parameter is configured as "off", one or more SRS resources of the set of SRS resources may be transmitted/send/broadcast using different/distinct spatial filters.

In some embodiments, a SRS resource may be associated/related/linked with a reference RS (e.g., a DL RS and/or an UL RS). If the SRS resource is associated with the reference RS, the SRS resource can be on a quasi-co beam as/with the reference RS. If the SRS resource is associated with the reference RS, the SRS resource may have at least one same/similar spatial parameter and/or precoding parameter as the reference RS. In some embodiments, a SRS resource set may be associated/related/linked with a reference RS. If the SRS resource set is associated with the reference RS, one or more SRS resources of the SRS resource set can be on a quasi-co beam as/with the reference RS. If the SRS resource set is associated with the reference RS, one or more SRS resources of the SRS resource set and the reference RS may have at least one same/similar spatial parameter and/or precoding parameter. In some embodiments, one or more SRS resources of the SRS resource set may not be configured with a parameter of spatial relation.

In some embodiments, the reference RS may be associated/related/linked with the SRS resource and/or SRS resource set. An explicit command (e.g., RRC parameter or MAC-CE command) and/or a rule (e.g., according to the RS indicated by the DCI for the PDSCH) may be used to configure an association/relationship between the reference RS and the SRS resource and/or SRS resource set. In some embodiments, beam management may configure the usage of the SRS.

Figure 9:
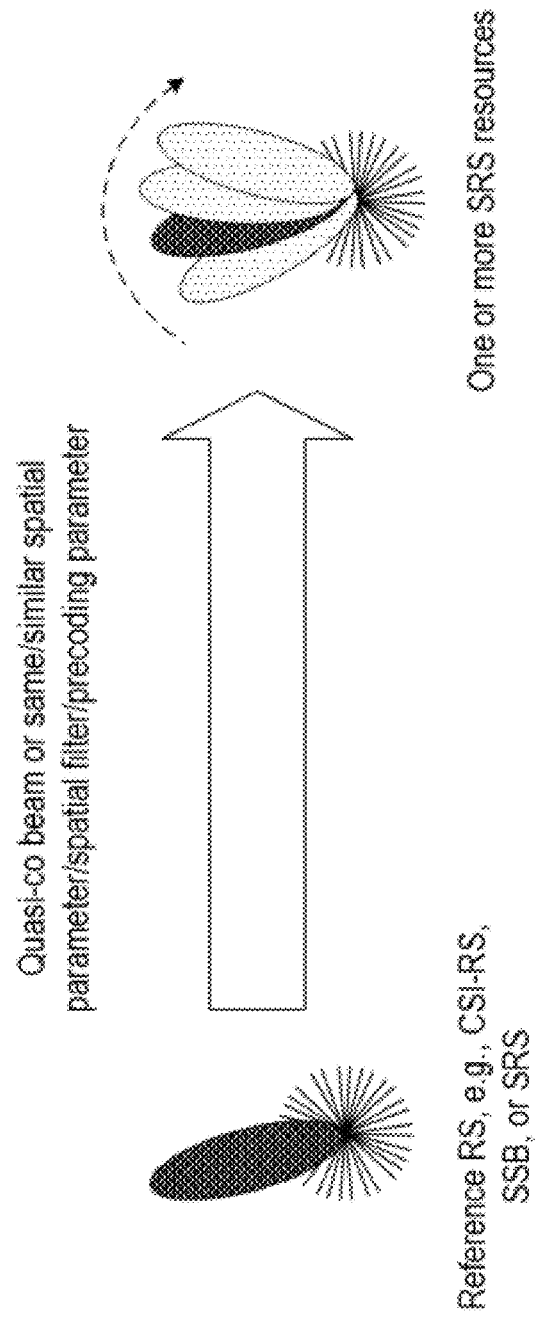
FIG. 9 illustrates example approaches for uplink (UL) beam refinement across a reference signal (RS), in accordance with some embodiments of the present disclosure.

Referring now to FIG. 9 depicted is an example approach 900 for UL beam refinement across a reference RS. In some embodiments, one or more SRS resources may be associated/related/linked with a reference RS (e.g., CSI-RS, SSB, and/or SRS). Therefore, the one or more SRS resources may be on a quasi-co beam as/with the reference RS. In some embodiments, the one or more SRS resources may have a same/similar spatial parameter, spatial filter, and/or precoding parameter as a reference RS. From the perspective of beam management, the one or more SRS resources may be transmitted with respective/corresponding neighboring beams across the beam corresponding to the reference RS.

D. Embodiment 4: Joint Procedure of DL/UL Beam Refinement and/or Beam Reporting

In some embodiments, a joint procedure may be used/implemented/designed/executed to accelerate beam refinement of the wireless communication device and/or wireless communication node. The joint procedure may include/perform/combine wireless communication node (e.g., gNB) DL Tx beam refinement, beam reporting, and/or wireless communication device (e.g., UE) UL Tx beam refinement. The joint procedure of embodiment 4 can be different/distinct from the joint procedure of embodiment 2, wherein the joint procedure of embodiment 2 may comprise wireless communication node DL Tx beam refinement, beam reporting, and/or wireless communication device UL Rx beam refinement.

In a joint procedure of DL and/or UL beam refinement, a command (e.g., DCI format 0_1, DCI format 0_2, and/or other commands) may trigger/cause a CSI report configuration and/or at least one SRS request. In some embodiments, a DCI (e.g., a DCI that includes the command) may trigger/cause at least one CSI triggering state. The at least one CSI triggering state may be associated/related with a CSI report configuration and/or at least one SRS request.

In some embodiments, a triggering offset for a SRS may refer/correspond to a time unit of a CSI-RS resource set and/or a time unit of a report instance. The report instance may correspond to the CSI report configuration as a starting point. In some embodiments, one or more SRS resources may correspond/refer to the SRS request. The one or more SRS resources may be associated with a reported/indicated RS of the report instance.

In some embodiments, at least one SRS resource of one or more SRS resources may be on a quasi-co beam as a reported RS. In some embodiments, at least one SRS resource of one or more SRS resources may have a same/similar spatial parameter and/or precoding parameter as a reported RS.

A minimum time gap between a RS resource/RS resource set and a SRS resource/SRS resource set may be determined by the capability of the wireless communication device. In some embodiments, the capability of the wireless communication device may determine a minimum time gap between an instance of a CSI report and a SRS resource/SRS resource set. In some embodiments, the minimum time gap may be predefined/predetermined.

In one example, the signaling capability of the wireless communication device may determine the time gap between a time unit (e.g., slot) of an instance of a CSI report and a time unit (e.g., slot) of a SRS resource in the SRS resource set.

In some embodiments, the SRS may be configured as a reference RS in the TCI state, which can be applied for UL and/or DL signals. In some embodiments, a usage of the SRS may be configured as beam management.

Figure 10:
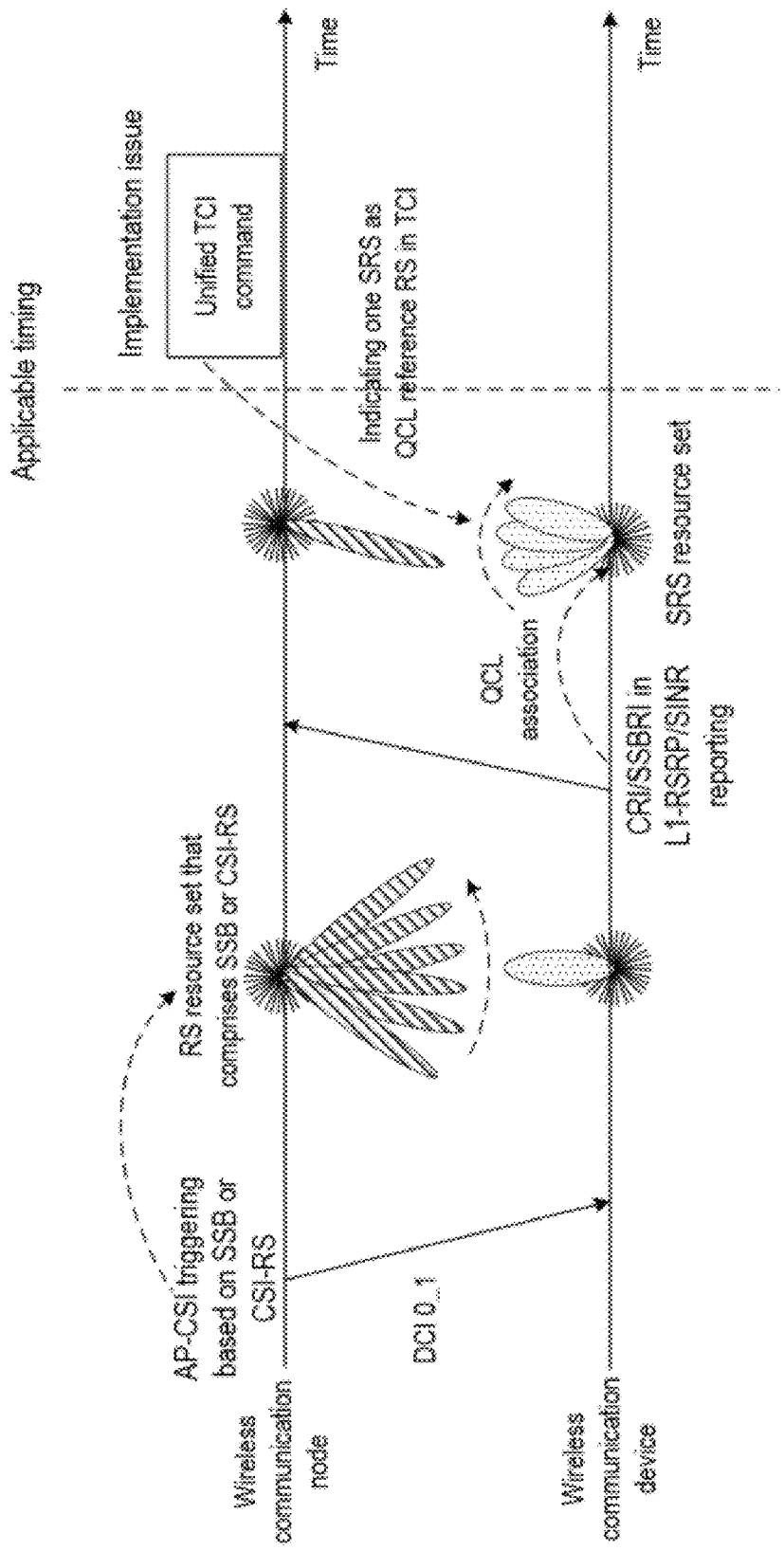
FIG. 10 illustrates example approaches for DL/UL beam refinement and/or beam reporting for DL/UL transmissions, in accordance with some embodiments of the present disclosure.

Referring now to FIG. 10 depicted is an example approach 1000 for DL/UL beam refinement and/or beam reporting for DL/UL transmissions. In some embodiments, a DCI may trigger/cause at least one CSI triggering state. The at least one CSI triggering state may be associated/related/linked with at least one report configuration and/or SRS request state. The at least one report configuration may comprise a first group of CSI-RS and/or SSB resources. The SRS request state may initialize one or more SRS resources. The first group of CSI-RS and/or SSB resources may be sent/transmitted/broadcast prior to a transmission of the SRS resources initialized by the SRS request state. The wireless communication device may measure/analyze the first group of CSI-RS and/or SSB resources. Responsive to measuring the first group, the wireless communication device may specify/report/indicate a corresponding report instance using a PUSCH (or other channels) scheduled by a DCI. The wireless communication node may use a DL RS included in the DCI as the reference RS for one or more SRS resources. The wireless communication device may refine at least one Tx beam while transmitting the one or more SRS resources. In some embodiments, the SRS resource set may include an AP-SRS. The AP-SRS can be configured as a reference RS using a TCI state, where the TCI state can be indicated/specified accordingly.

E. Embodiment 5: Requesting Candidate Beams for Refinement by the Wireless Communication Device A capability of a wireless communication device and/or at least one predictive algorithm may be used for wireless communication device (e.g., UE) Tx/Rx beam refinement. The capability and/or predictive algorithm(s) of wireless communication device Tx/Rx beam refinement may determine the amount of candidate beams to be transmitted. In some embodiments, the wireless communication node may be unable to identify/specify/guarantee an amount of DL RS resources and/or UL RS resources to be used for wireless communication device beam refinement. In some embodiments, the wireless communication device may indicate/provide/specify the number of CSI-RS and/or SRS resources. The wireless communication device may use UE capability reporting and/or dynamic reporting by uplink control information (UCI) and/or medium access control control element (MAC-CE) to indicate the number of CSI-RS and/or SRS resources.

For example, the number of CSI-RS resources of the second RS resource set of FIG. 8 and/or the number of SRS resources of FIG. 10 may be determined by the capability of the wireless communication device. The wireless communication device may report/specify/indicate the number of CSI-RS resources and/or SRS resources using UCI and/or a MAC-CE command.

In some embodiments, the wireless communication device may report the number of CSI-RS resources and/or SRS resources for a first type mode and/or a second type mode. The first type mode may correspond to beam refinement with a reference RS. The second type mode may correspond to beam refinement without the reference RS.

The reference RS may correspond/refer to a spatial relation, a spatial filter, and/or a spatial parameter.

The first type mode may resemble (or correspond to) beam refinement across a beam.

The second type mode may resemble (or correspond to) a complete Rx beam sweeping.

In some embodiments, the wireless communication device may use/send a requesting command to request a procedure of receiving/obtaining one or more CSI-RS resources and/or transmitting/broadcasting one or more SRS resources. For example, the wireless communication device may send a scheduling request (SR) using a PUCCH (or other signals) to request a procedure of receiving/obtaining one or more CSI-RS resources.

The wireless communication device may report/provide/indicate the number of CSI-RS resources and/or SRS resources corresponding to the request procedure. The wireless communication device may use capability reporting to specify the number of CSI-RS resources and/or SRS resources.

At least one CSI-RS may be configured with a repetition parameter. In some embodiments, the repetition parameter may be configured as "on".

In some embodiments, a usage of a SRS may be configured as "beam management".

Figure 11:
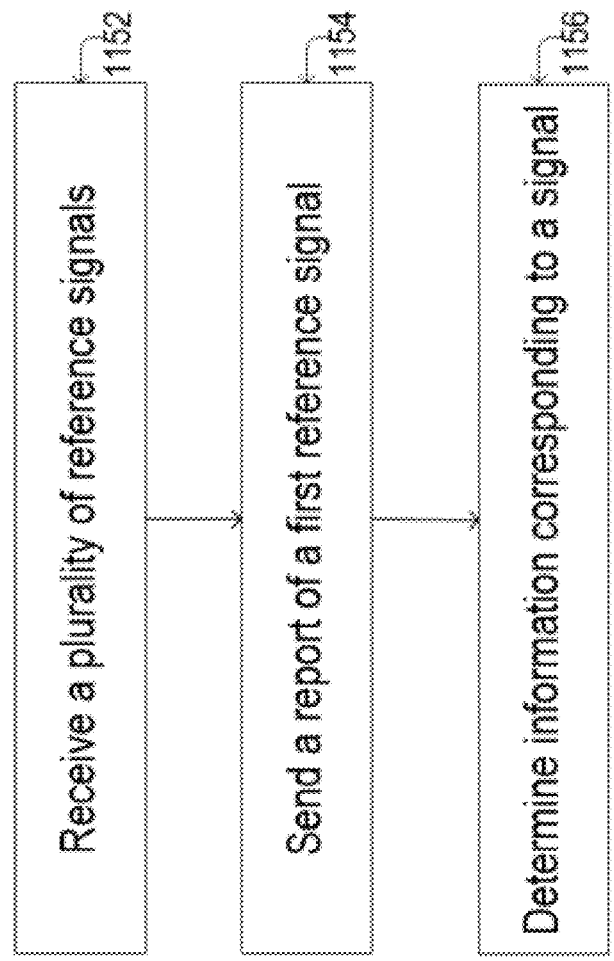
FIG. 11 illustrates a flow diagram of an example method for fast beam refinement and/or tracking for high mobility wireless communication device, in accordance with an embodiment of the present disclosure.

F. Methods for Fast Beam Refinement and/or Tracking for High Mobility Wireless Communication Device FIG. 11 illustrates a flow diagram of a method 1150 for fast beam refinement and/or tracking for high mobility wireless communication device. The method 1150 may be implemented using any of the components and devices detailed herein in conjunction with FIGS. 1-10. In overview, the method 1150 may include receiving a plurality of reference signals (1152). The method 1150 may include sending a report of a first reference signal (1154). The method 1150 may include determining information corresponding to a signal (1156).

Referring now to operation (1152), and in some embodiments, a wireless communication device (e.g., a UE) may receive/obtain a plurality of reference signals (RSs) from the wireless communication node. The wireless communication node (e.g., gNB) may send/transmit/broadcast the plurality of RSs (e.g., AP-CSI-RS and/or other signals) to the wireless communication device. In some embodiments, a first RS of the plurality of RSs may be periodic, semi-persistent, and/or other time domain types. In some embodiments, the wireless communication device may send/transmit/broadcast a report to the wireless communication node. The wireless communication node may receive/obtain the report from the wireless communication device via UE capability reporting, dynamic reporting (e.g., by UCI and/or MAC-CE), and/or other types of reporting. The report may indicate/provide/specify a number/amount of channel state information reference signal (CSI-RS) and/or sounding reference signal (SRS) resources. In some embodiments, the wireless communication device may send the report indicative of a number of CSI-RS and/or SRS resources for a first mode with a reference RS (or other signals). The wireless communication device may send the report indicative of a number of CSI-RS and/or SRS resources for a second mode without/excluding the reference RS. In some embodiments, the reference RS may correspond to a spatial relation, a spatial filter, and/or or a spatial parameter. The reference RS may be used to determine the spatial relation, the spatial filter, and/or or the spatial parameter.

In some embodiments, the wireless communication device may send/transmit a request for a procedure. The procedure may correspond to a procedure of CSI-RS and/or SRS transmission. In some embodiments, the wireless communication node may receive/obtain the request for a procedure (e.g., procedure of CSI-RS and/or SRS transmission) from the wireless communication device. The wireless communication device may send/transmit/broadcast the request for the procedure using a requesting command (e.g., a scheduling request (SR) request by a PUCCH and/or other commands). In some embodiments, the wireless communication device may send/transmit a report to the wireless communication node. The wireless communication node may receive/obtain the report via capability reporting (or other types of reporting) from the wireless communication device. The report may indicate/provide/specify the number/amount of CSI-RS and/or SRS resources corresponding to the procedure. In some embodiments, a CSI-RS can be configured with a repetition parameter of "on". In some embodiments, the usage of a SRS may be configured as "beam management".

Referring now to operation (1154), and in some embodiments, the wireless communication device may send/transmit a report of at least a first RS of the plurality of RSs to the wireless communication node. The wireless communication node may receive/obtain the report (e.g., a report instance, a CSI report, and/or other reports) from the wireless communication device. In some embodiments, the report may include/provide/specify/indicate a RSRP, a SINR, and/or other information. In some embodiments, the first RS of the plurality of RSs can be periodic, semi-persistent, and/or other time domain types. In some embodiments, a reference RS may correspond to the first RS. In some embodiments, the reference RS may be QCLed with the first RS. The reference RS may be used to determine/configure the TCI state, the spatial relation, the QCL assumption and/or the PL-RS of the signal (e.g., a PDSCH, a PDCCH, a SSB, a CSI-RS, and/or other signals). In some embodiments, the QCL assumption corresponding to the signal may refer/correspond to QCL type A, QCL type B and/or QCL type C. In some embodiments, the reference RS (e.g., used to determine the TCI state, the spatial relation, the QCL assumption and/or the PL-RS of the signal) may be periodic, semi-persistent, and/or a channel state information reference signal (CSI-RS) for tracking. In some embodiments, the first RS of the plurality of RSs may be aperiodic and/or other time domain types. In some embodiments, the reference RS (e.g., used to determine the TCI state, the spatial relation, the QCL assumption and/or the PL-RS of the signal) may be periodic and/or semi-persistent, wherein the first RS may be aperiodic (or other time domain types).

In some embodiments, the report may correspond to a report of one or more RSs of the plurality of RSs. In some embodiments, DCI (or other information) may carry/include/provide a TCI indication. The TCI indication may indicate/specify the first RS of the one or more RSs. In some embodiments, the one or more RSs may each be associated/related/linked with a respective one of TCI codepoints. The TCI codepoints may correspond to a TCI field (or other fields) of the DCI (e.g., the DCI that includes a TCI indication). In some embodiments, the first RS may correspond to or include a RS that is ordered first within the report (e.g., a report instance and/or a CSI report). The first RS may be associated/related/linked with an identifier, such as a lowest identifier (ID), a highest ID or a specific ID among/within the one or more RSs. The first RS and the signal may be associated/related/linked with a same/corresponding control resource set (CORESET) pool ID, a same group information, and/or other identifiers.

In some embodiments, the wireless communication device and/or wireless communication node may trigger/cause a CSI triggering state by using a DCI (or other information). The CSI triggering state may be associated/related/linked with one or more RS resource sets. The one or more RS resource sets may include one or more RSs and/or RS resources. In one example, a first RS resource set may include a plurality of RSs. In the same example, a second RS resource set may be associated/related to the signal. In some embodiments, the CSI triggering state may be associated/related/linked with one or more CSI report configurations (or other configurations). Each CSI report configuration of the one or more CSI report configurations may include at least one of the one or more RS resource sets. In some embodiments, a PUSCH (or other UL channels/signals) scheduled by the DCI may carry/include/provide/indicate/specify the report. In some embodiments, the report may correspond/refer to a report of at least one of the RSs from one of the one or more RS resource sets. In some embodiments, CSI-RS resources in the one or more RS resource sets may be associated/related/linked with a same quasi co-location (QCL) assumption and/or QCLed.

In some embodiments, a TCI field (or other fields) of the DCI may indicate/specify/provide a quasi co-location (QCL) assumption, a TCI state of the one or more RS resource sets, and/or other information. The one or more RS resource sets may be configured with repetition as "off". In some embodiments, a first RS resource set of the one or more RS resource sets may comprise/include a SSB, a CSI-RS, and/or other signals. The CSI-RS may be periodic, semi-persistent and/or aperiodic. In some embodiments, the first RS resource set may include the CSI-RS and/or other signals. If the first RS resource set includes the CSI-RS, the first RS resource set may be configured with repetition as "off". In some embodiments, the report may include/correspond to a first RS resource set of the one or more RS resource sets. A PUSCH (or other channels/signals) scheduled by the DCI may carry/include/provide the report. In some embodiments, the signal may comprise/include at least one RS resource in a second RS resource set of the one or more RS resource sets. The wireless communication device may determine information (e.g., TCI state, spatial relation, QCL assumption, and/or other information) corresponding to the at least one RS resource. The wireless communication device may determine the information according to the first RS. The first RS can be associated/related with a first RS resource set of the one or more RS resource sets. In some embodiments, beam switching timing may (only) be applied to the first RS resource set.

In some embodiments, an offset for the second RS resource set can be based on a slot (or other time instances) of the report, a slot (or other time instances) of the DCI (or other information), and/or other time instances. In some embodiments, the second RS resource set may include the CSI-RS (or other signals). The second RS resource set may be configured with repetition as "on". In some embodiments, a second RS resource set of the one or more RS resource sets may have no associated/related reporting. A report quantity corresponding/referring to the second RS resource set may be "none". In some embodiments, a minimum time gap may be defined/measured/determined between a first RS resource set of the one or more RS resource sets and a second RS set of the one or more RS resource sets. The minimum time gap may be defined/measured/determined between the report and a second RS resource set of the one or more RS resource sets. In some embodiments, the minimum time gap may be predefined and/or based on a capability (e.g., signaling capability) of the wireless communication device. In some embodiments, the minimum time gap may correspond/refer to a time window in which one or more operations (e.g., a report and/or other operations) are performed/executed. In some embodiments, the minimum time gap may correspond to a time separation/difference between two or more operations.

In some embodiments, the signal may comprise one or more sounding RS (SRS) resources (or other resources). A command (e.g., a DCI command) may be used to trigger/cause a CSI triggering state and/or a request for the one or more SRS resources. The CSI triggering state may be associated/related/linked with one or more RS resource sets. In some embodiments, the one or more SRS resources may be sent/transmitted/broadcasted with different/separate/distinct spatial filters (or other filters). In some embodiments, the DCI (or other information) can include/provide/specify/carry/deliver the command. The CSI triggering state triggered by the DCI may be associated/related with the SRS request. In some embodiments, an offset for SRS may be based on a time unit of a RS resource set and/or other time instances. In some embodiments, the offset for SRS may be based on a time unit of a report corresponding/referring to the CSI report configuration and/or other time instances. In some embodiments, at least one of the one or more SRS resources may be on a quasi-co beam as the first RS. In some embodiments, the at least one of the one or more SRS resources may have a same/similar parameter as the first SRS, wherein the parameter comprises at least one of a spatial parameter, a precoding parameter, and/or other parameters.

In some embodiments, a minimum time gap may be defined/measured/determined between a resource or a set of the one or more RS resource sets and at least one of the one or more SRS resources. The minimum time gap may be defined/measured/determined between the report and the SRS. In some embodiments, the minimum time gap may be predefined and/or based on a capability of the wireless communication device. In some embodiments, the SRS may be configurable as a reference RS in a TCI state (or other information). The configurable SRS of the TCI state can be applied to uplink signals (e.g. PUSCH, PUCCH, and/or other signals), downlink signals (e.g., PDCCH, PDSCH, and/or other signals) and/or other types of signals. In some embodiments, a usage of the SRS may be configured as beam management. In some embodiments, a repetition parameter may be associated/linked with the one or more SRS resources. The one or more SRS resources may be sent/transmitted/broadcasted with a same/corresponding spatial filter (or other filters) when the repetition parameter is configured as "on". The one or more SRS resources may be sent/transmitted/broadcasted with different/distinct/separate spatial filters (or other filters) when the repetition parameter is configured as "off".

Referring now to operation (1156), and in some embodiments, the wireless communication device may determine information corresponding to a signal (e.g., UL signals, DL signals, and/or other signals). The wireless communication device may use the first SRS and/or information of the first SRS to determine the information corresponding to the signal. In some embodiments, the signal may include/comprise at least one of a PDSCH, a PDCCH, a SSB, a CSI-RS, a PRACH, a PUCCH, a PUSCH, a SRS, and/or other signals. In some embodiments, the information may comprise at least one of a TCI state, a spatial relation, a QCL assumption, a PL-RS, and/or other information. For example, the wireless communication device may determine a TCI state, a spatial relation, and/or a QCL assumption corresponding to a UL/DL signal (e.g., PUSCH, PDSCH, and/or other signals) according to the first RS. In some embodiments, the signal may not be configured with a TCI state, a PL-RS and/or spatial relation (information). In some embodiments, the QCL assumption may correspond to one or more of QCL type A, QCL type B and/or QCL type C.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
  receiving, by a wireless communication device from a wireless communication node, a plurality of reference signals (RSs) of a first RS resource set of a plurality of RS resource sets;
  sending, by the wireless communication device to the wireless communication node, a report of at least a first RS of the plurality of RSs;
  determining, by the wireless communication device, information corresponding to a signal according to the first RS, the information comprising a spatial relation and a quasi co-located (QCL) assumption;
  triggering a channel state information (CSI) triggering state by downlink control information (DCI), wherein the CSI triggering state is associated with the plurality of RS resource sets; and
  sending a second RS resource set of the plurality of RS resource sets,
  wherein a minimum time gap is predefined or based on a capability of the wireless communication device, the minimum time gap between the second RS resource set and one of:
    the first RS resource set; or
    the report.

2. The method of claim 1, wherein the signal comprises at least one of: a physical downlink shared channel (PDSCH), a physical downlink control channel (PDCCH), a synchronization signal block (SSB), a channel state information reference signal (CSI-RS), a preamble random access channel (PRACH), a physical uplink control channel (PUCCH), a physical uplink shared channel (PUSCH) or a sounding reference signal (SRS).

3. The method of claim 1, wherein the minimum time gap is between the first RS resource set and the second RS resource set.

4. The method of claim 1, wherein the minimum time gap is between the first RS resource set and the report.

5. The method of claim 1, wherein:
  a reference RS corresponding to the first RS or that is quasi co-located (QCLed) with the first RS, is used for determining the spatial relation, and the QCL assumption and
  the QCL assumption corresponds to at least one of:
    a doppler shift,
    a doppler spread,
    an average delay, or
    a delay spread.

6. The method of claim 5, wherein:
the reference RS is periodic, semi-persistent or a channel state information reference signal (CSI-RS) for tracking, or
the first RS is aperiodic.

7. The method of claim 1, wherein the first RS is periodic or semi-persistent.

8. The method of claim 1, wherein the signal is not configured with a transmission configuration indicator (TCI) state, a pathloss reference signal (PL-RS), or a spatial relation.

9. The method of claim 1, wherein the report is a report of more than one RSs of the plurality of RSs,
a transmission configuration indicator (TCI) indication in downlink control information (DCI) is to indicate the first RS of the one or more RSs, or
the one or more RSs each are associated with a respective one of TCI codepoints corresponding to a TCI field in the DCI.

10. The method of claim 9, wherein a second minimum time gap between a resource or a set of the more than one sounding RS (SRS) resource sets and at least one of one or more SRS resources is predefined or based on a capability of the wireless communication device.

11. The method of claim 1, wherein the report is a report of more than one RSs of the plurality of RSs, and at least one of:
the first RS is a RS that is ordered first within the report,
the first RS is associated with a lowest identifier (ID), a highest ID or a specific ID within the one or more RSs, or
the first RS is associated with a same control resource set (CORESET) pool ID or a same group information as the signal.

12. The method of claim 11, further comprising:
determining, by the wireless communication device, information corresponding to at least one RS resource, according to a first RS that is associated with the first RS resource set of the more than one RS resource sets, wherein beam switching timing is only applied to the first RS resource set.

13. The method of claim 1, wherein the signal comprises one or more sounding RS (SRS) resources, further comprising:
triggering, by the wireless communications node, a channel state information (CSI) triggering state and a request for the one or more SRS resources by a command, wherein the CSI triggering state is associated with one or more RS resource sets, wherein an offset for SRS is based on a time unit of a RS resource set or a time unit of a report corresponding to a CSI report configuration.

14. The method of claim 1, comprising:
sending, by the wireless communication device to the wireless communication node, a report indicative of a number of channel state information reference signal (CSI-RS) or sounding reference signal (SRS) resources.

15. The method of claim 1, comprising:
sending, by the wireless communication device to the wireless communication node, a report indicative of a number of channel state information reference signal (CSI-RS) or sounding reference signal (SRS) resources for a first mode, the first mode corresponding to beam refinement with a reference RS, or for a second mode, the second mode corresponding to beam refinement without the reference RS.

16. The method of claim 1, comprising:
sending, by the wireless communication device, a request for a procedure of channel state information reference signal (CSI-RS) or sounding reference signal (SRS) transmission.

17. A method comprising:
sending, by a wireless communication node to a wireless communication device, a plurality of reference signals (RSS);
receiving, by the wireless communication node from the wireless communication device, a report of at least a first RS of the plurality of RSs, the report comprising information corresponding to a signal according to the first RS, the information comprising a spatial relation and a quasi co-located (QCL) assumption;
triggering a channel state information (CSI) triggering state by downlink control information (DCI), wherein the CSI triggering state is associated with one or more RS resource sets of a plurality of RS resource sets; and
sending a second RS resource set of the plurality of RS resource sets,
wherein a minimum time gap is predefined or based on a capability of the wireless communication device, the minimum time gap between the second RS resource set and one of:
a first RS resource set of the plurality of RS resource sets; or
the report.

18. A wireless communication device comprising:
at least one processor configured to:
receive, via a transceiver from a wireless communication node, a plurality of reference signals (RSs) of a first RS resource set of a plurality of RS resource sets;
send, via the transceiver to the wireless communication node, a report of at least a first RS of the plurality of RSs;
determine information corresponding to a signal according to the first RS, the information comprising a spatial relation and a quasi co-located (QCL) assumption;
triggering a channel state information (CSI) triggering state by downlink control information (DCI), wherein the CSI triggering state is associated with the plurality of RS resource sets; and
sending a second RS resource set of the plurality of RS resource sets,
wherein a minimum time gap is predefined or based on a capability of the wireless communication device, the minimum time gap between the second RS resource set and one of:
the first RS resource set; or
the report.

19. A wireless communication node comprising:
at least one processor configured to:
send, via a transceiver to a wireless communication device, a plurality of reference signals (RSS);
receive, via the transceiver from the wireless communication device, a report of at least a first RS of the plurality of RSs, the report comprising information corresponding to a signal according to the first RS, the information comprising a spatial relation and a quasi co-located (QCL) assumption;

trigger a channel state information (CSI) triggering state by downlink control information (DCI), wherein the CSI triggering state is associated with one or more RS resource sets of a plurality of RS resource sets; and send a second RS resource set of the plurality of RS resource sets, wherein a minimum time gap is predefined or based on a capability of the wireless communication device, the minimum time gap between the second RS resource set and one of:
  a first RS resource set of the plurality of RS resource sets; or
  the report.

20. The wireless communication node of claim 19, wherein the signal comprises one or more sounding RS (SRS) resources, and the at least one processor is configured to:

trigger a channel state information (CSI) triggering state and a request for the one or more SRS resources by a command, wherein the CSI triggering state is associated with one or more RS resource sets, wherein an offset for SRS is based on a time unit of a RS resource set or a time unit of a report corresponding to a CSI report configuration.

* * * * *